Sept. 14, 1954  G. BARBERIS  2,689,087
TICKET DELIVERY AND RECORDING MACHINE
Filed Jan. 26, 1951  31 Sheets-Sheet 1
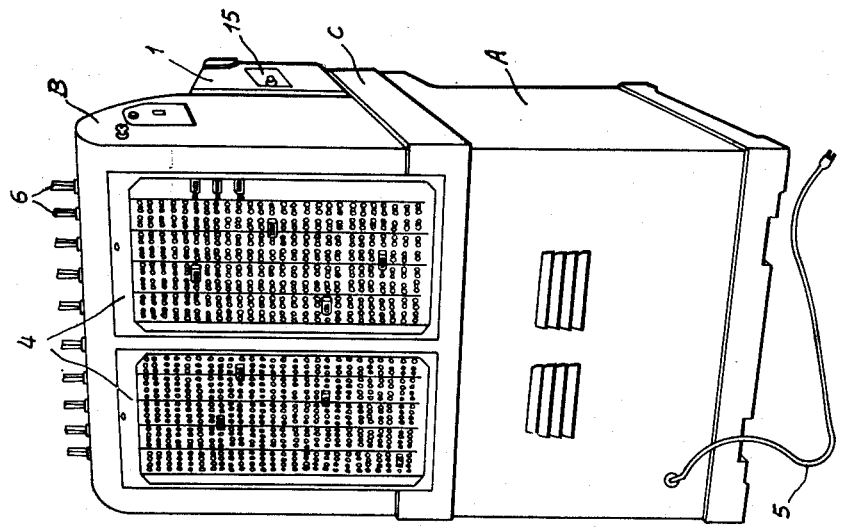
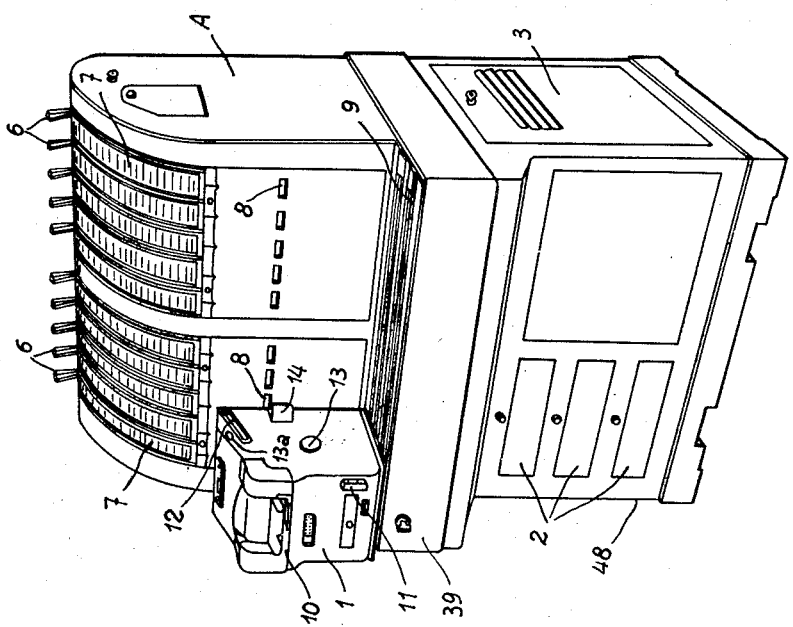
INVENTOR
GIOVANNI BARBERIS
BY:
Haseltine, Lake & Co.
AGENTS

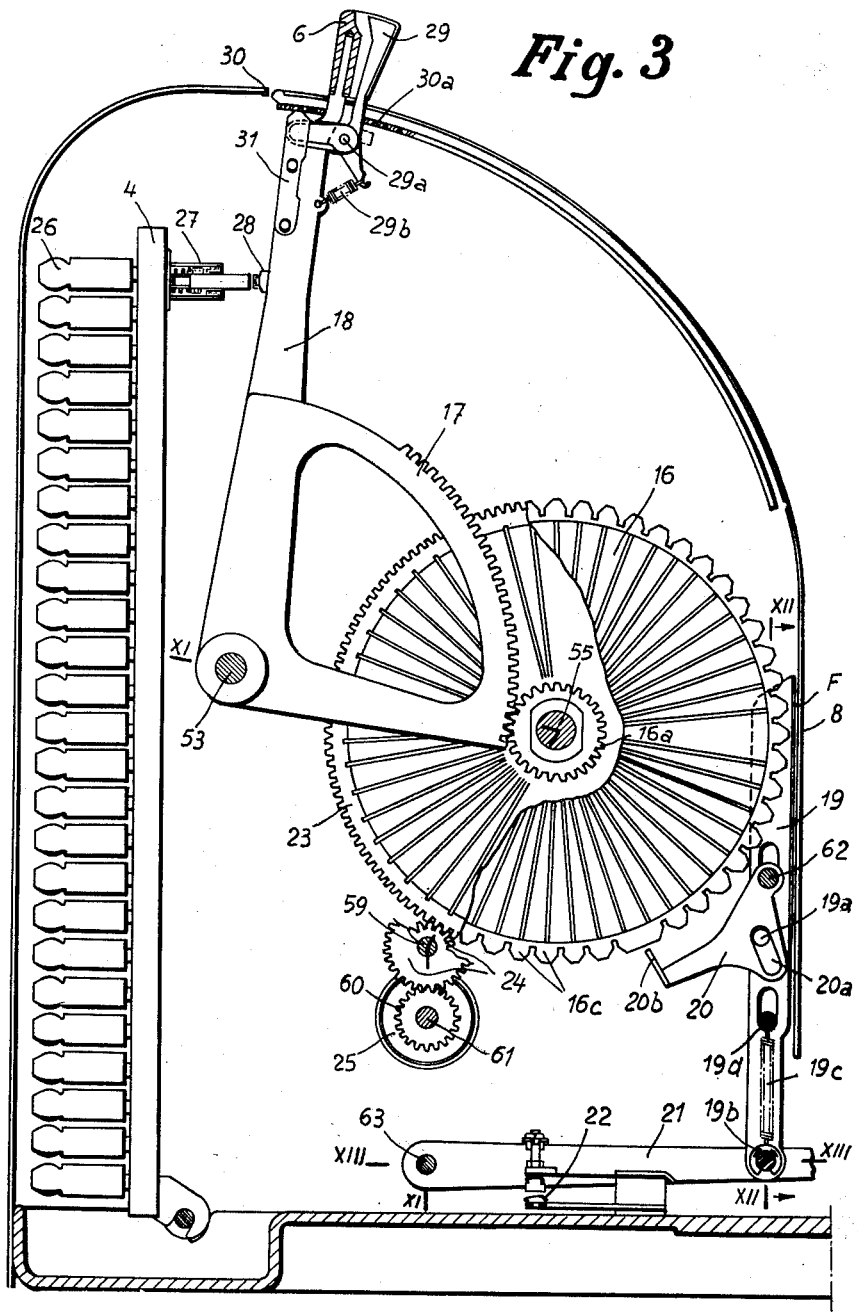

Sept. 14, 1954         G. BARBERIS         2,689,087
TICKET DELIVERY AND RECORDING MACHINE
Filed Jan. 26, 1951         31 Sheets-Sheet 3

INVENTOR
GIOVANNI BARBERIS
By:
Haseltine, Lake & Co.
AGENTS

Sept. 14, 1954     G. BARBERIS     2,689,087
TICKET DELIVERY AND RECORDING MACHINE
Filed Jan. 26, 1951     31 Sheets-Sheet 5

INVENTOR
GIOVANNI BARBERIS
By:
Haseltine, Lake & Co.
AGENTS

Sept. 14, 1954  G. BARBERIS  2,689,087
TICKET DELIVERY AND RECORDING MACHINE
Filed Jan. 26, 1951  31 Sheets-Sheet 6

Sept. 14, 1954          G. BARBERIS          2,689,087
TICKET DELIVERY AND RECORDING MACHINE
Filed Jan. 26, 1951          31 Sheets-Sheet 7

Sept. 14, 1954 G. BARBERIS 2,689,087
TICKET DELIVERY AND RECORDING MACHINE
Filed Jan. 26, 1951 31 Sheets-Sheet 9

INVENTOR
GIOVANNI BARBERIS
By:
Haseltine, Lake & Co.
AGENTS

Sept. 14, 1954  G. BARBERIS  2,689,087
TICKET DELIVERY AND RECORDING MACHINE
Filed Jan. 26, 1951  31 Sheets-Sheet 10

INVENTOR
GIOVANNI BARBERIS
By:
Haseltine, Lake & Co.
AGENTS

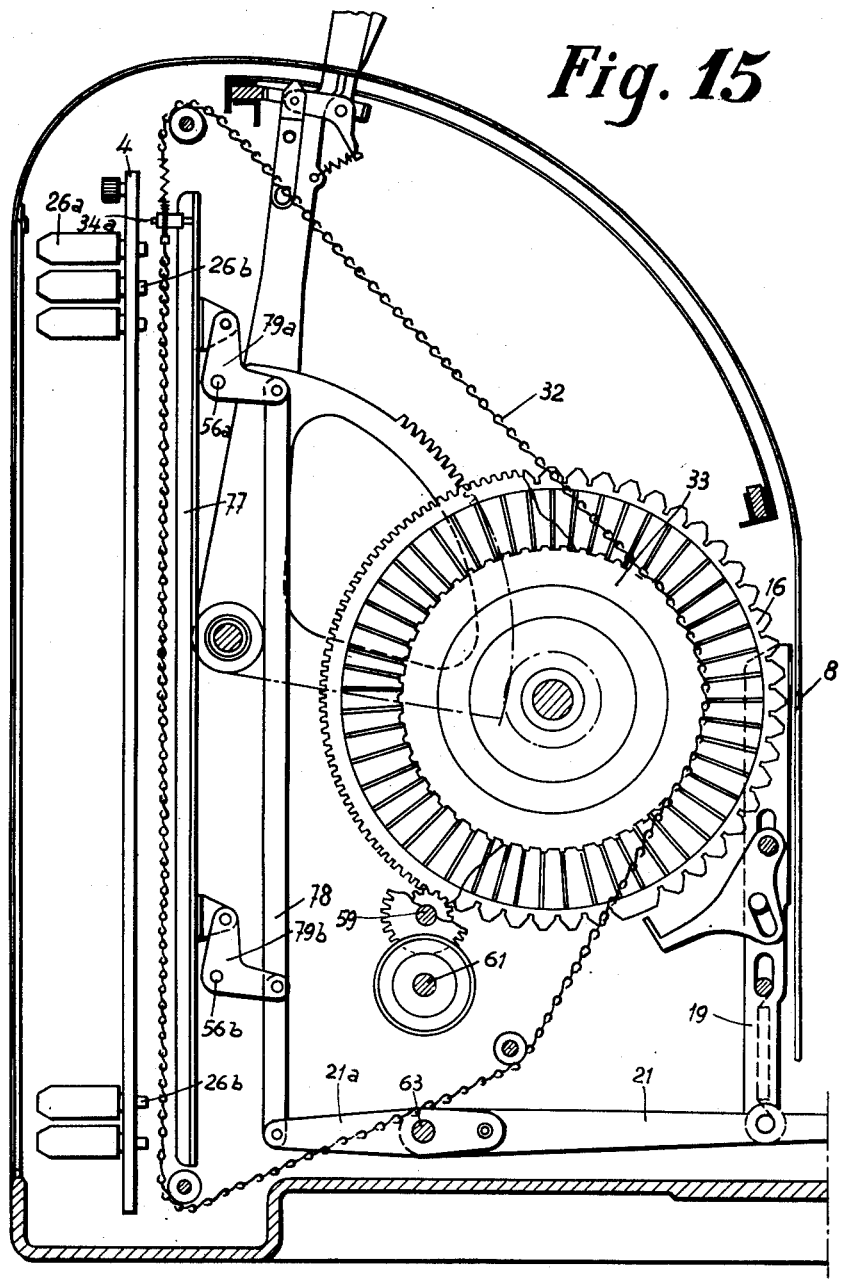

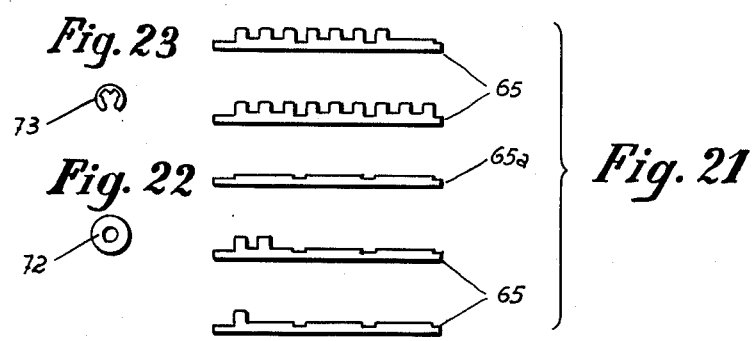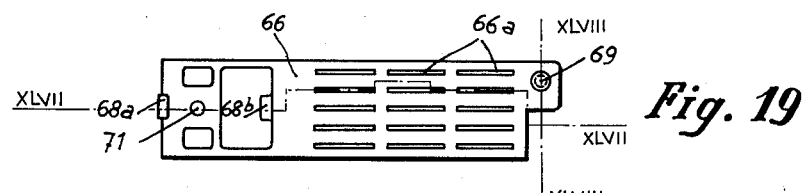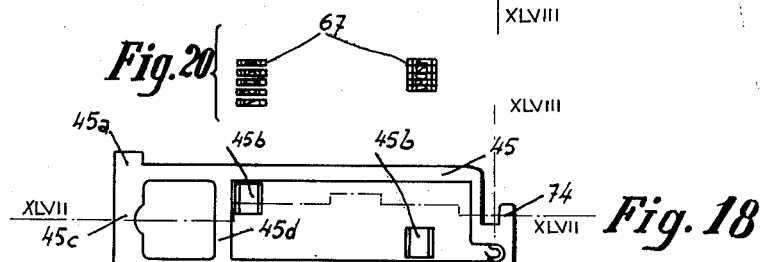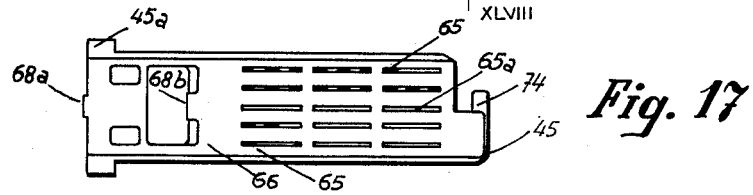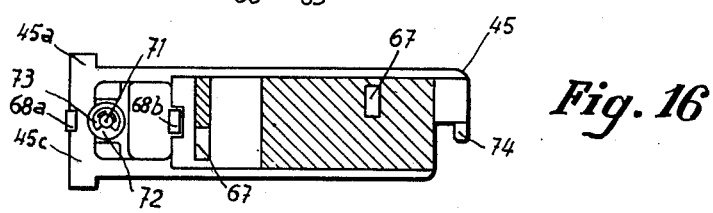

Sept. 14, 1954    G. BARBERIS    2,689,087
TICKET DELIVERY AND RECORDING MACHINE
Filed Jan. 26, 1951    31 Sheets-Sheet 13

Sept. 14, 1954                G. BARBERIS                2,689,087
                   TICKET DELIVERY AND RECORDING MACHINE
Filed Jan. 26, 1951                                    31 Sheets-Sheet 14

Sept. 14, 1954     G. BARBERIS     2,689,087
TICKET DELIVERY AND RECORDING MACHINE
Filed Jan. 26, 1951     31 Sheets-Sheet 15

Sept. 14, 1954     G. BARBERIS     2,689,087
TICKET DELIVERY AND RECORDING MACHINE
Filed Jan. 26, 1951     31 Sheets-Sheet 16

Sept. 14, 1954  G. BARBERIS  2,689,087
TICKET DELIVERY AND RECORDING MACHINE
Filed Jan. 26, 1951  31 Sheets-Sheet 18

Sept. 14, 1954         G. BARBERIS                2,689,087
            TICKET DELIVERY AND RECORDING MACHINE
Filed Jan. 26, 1951                              31 Sheets-Sheet 19

Sept. 14, 1954    G. BARBERIS    2,689,087
TICKET DELIVERY AND RECORDING MACHINE
Filed Jan. 26, 1951    31 Sheets-Sheet 20

Sept. 14, 1954

G. BARBERIS 2,689,087

TICKET DELIVERY AND RECORDING MACHINE

Filed Jan. 26, 1951

Sept. 14, 1954 G. BARBERIS 2,689,087
TICKET DELIVERY AND RECORDING MACHINE
Filed Jan. 26, 1951 31 Sheets-Sheet 23

INVENTOR
GIOVANNI BARBERIS
By:
Haseltine, Lake & Co.
AGENTS

Sept. 14, 1954   G. BARBERIS   2,689,087
TICKET DELIVERY AND RECORDING MACHINE
Filed Jan. 26, 1951   31 Sheets-Sheet 25
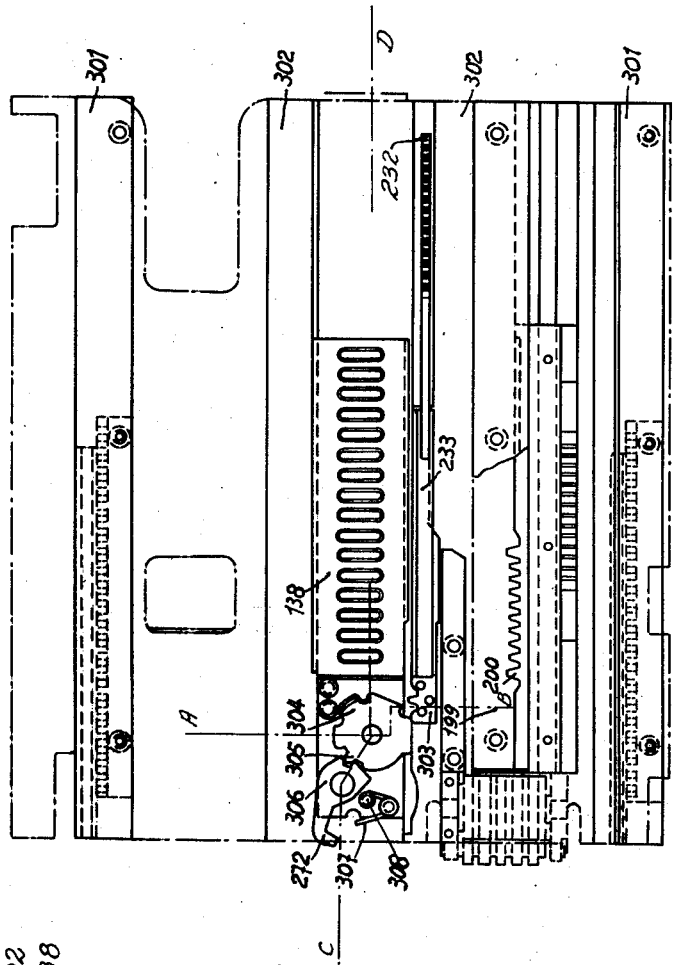
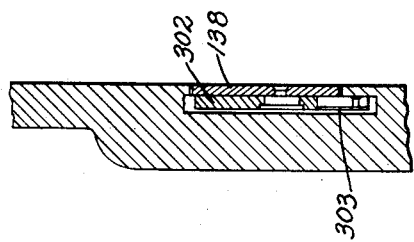
INVENTOR
GIOVANNI BARBERIS Sept. 14, 1954        G. BARBERIS        2,689,087
TICKET DELIVERY AND RECORDING MACHINE
Filed Jan. 26, 1951        31 Sheets-Sheet 26
Fig. 41
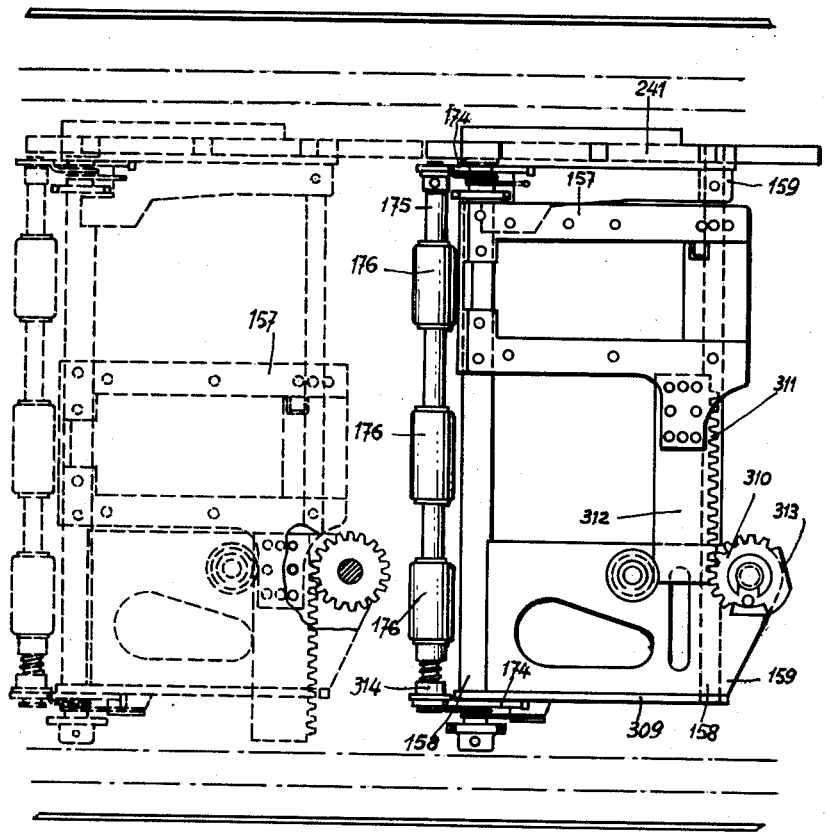
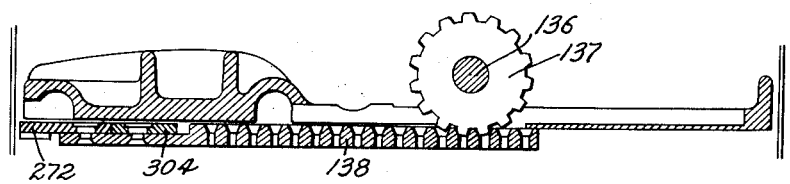
Fig. 40b
INVENTOR
GIOVANNI BARBERIS
By:
Haseltine, Lake & Co.
AGENTS

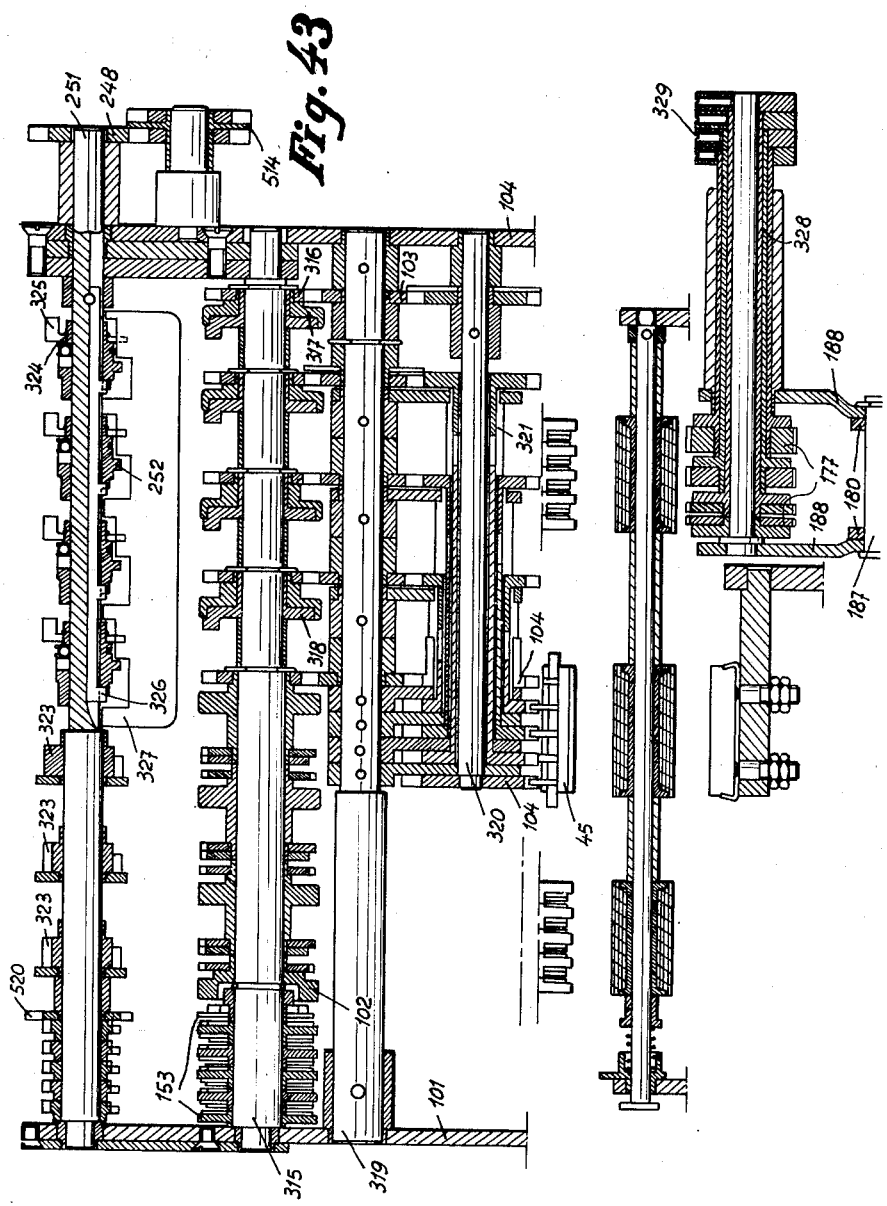

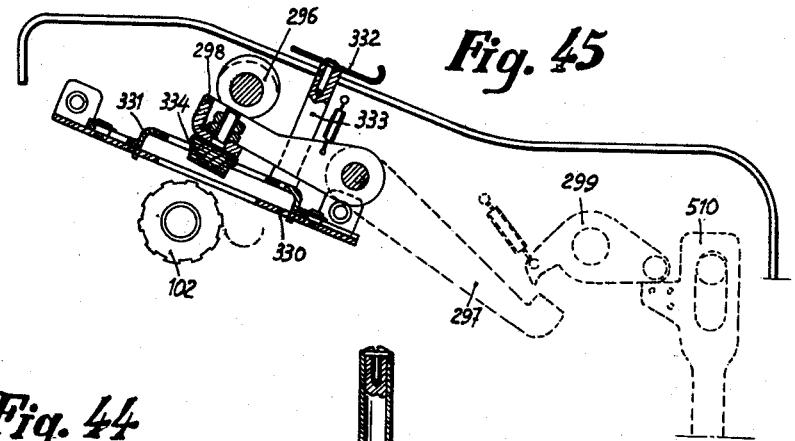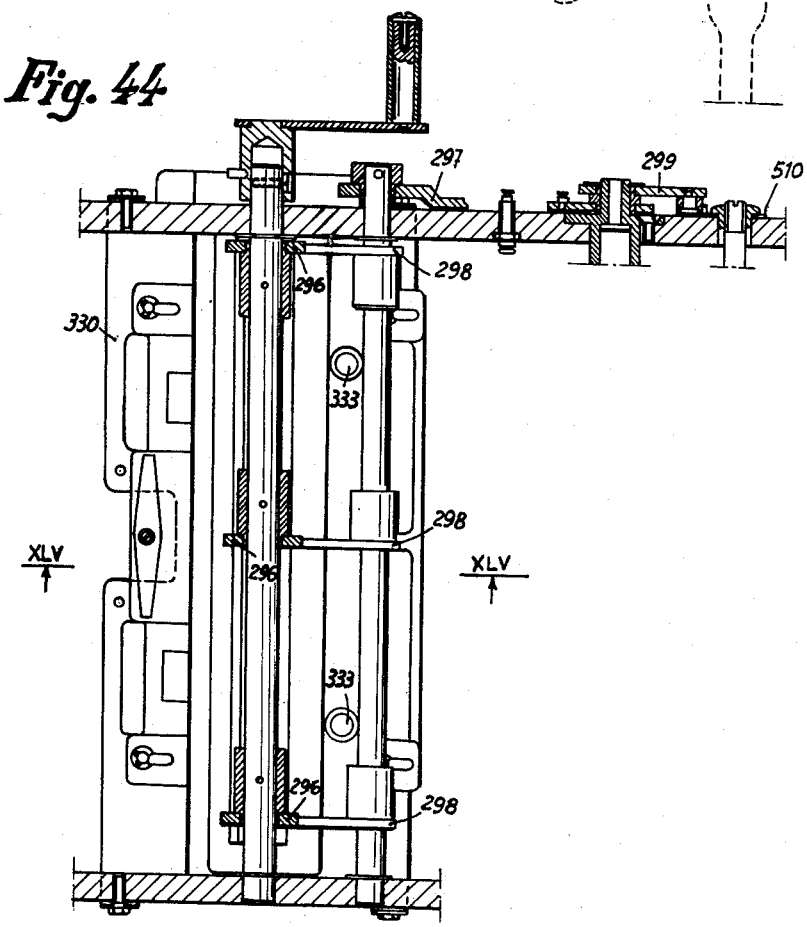

Sept. 14, 1954        G. BARBERIS        2,689,087
TICKET DELIVERY AND RECORDING MACHINE
Filed Jan. 26, 1951        31 Sheets-Sheet 30

INVENTOR
GIOVANNI BARBERIS
By:
Hazeltine, Lake & C°
AGENTS

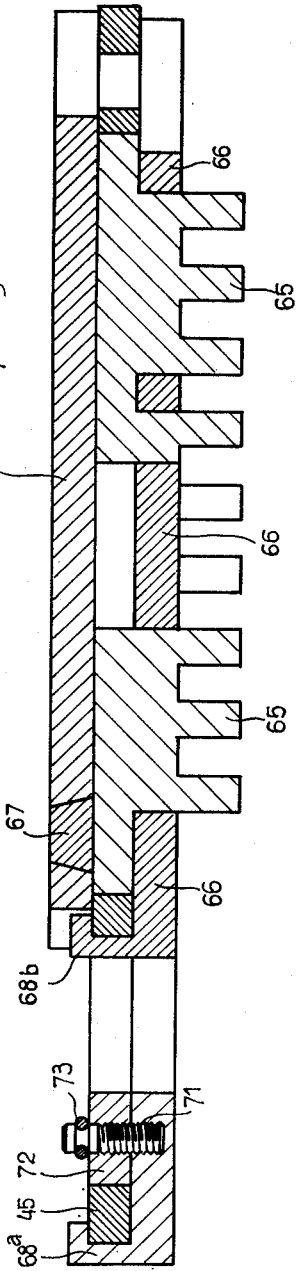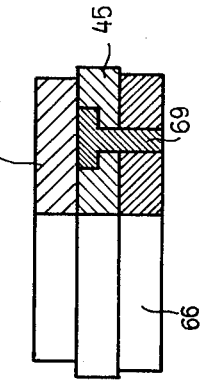

Patented Sept. 14, 1954

2,689,087

UNITED STATES PATENT OFFICE 2,689,087

TICKET DELIVERY AND RECORDING MACHINE

Giovanni Barberis, Turin, Italy, assignor to Riv-Officine di Villar Perosa Società per Azioni, Turin, Italy Application January 26, 1951, Serial No. 207,970

Claims priority, application Italy January 27, 1950

14 Claims. (Cl. 235—101)

This invention relates to a machine for delivering and recording tickets, such as railway tickets.

A first object of this invention is to provide a machine in which the amount printing blocks and the totalizer control means are carried by frames accommodated within radial seatings in drum-shaped magazines rotatable about a common axis in the machine casing upon actuation of the setting levers, while the printing and totalizer devices are enclosed within a slide mounted for displacement on the machine casing in a direction parallel with the axis of rotation of the magazines.

On delivery of each ticket the slide is brought in front of the selected row or bank, the pre-selected, printing block frame is extracted by the setting manipulation from the magazine, introduced into the slide in which it carries out the printing and totalizing operations and is retracted at the end of the cycle into its seating within the magazine.

It is therefore possible to manufacture machines of different capacities by varying the number of magazines and setting banks, while utilizing the same printing and totalizing slide.

A further object of this invention consists in providing a machine in which the amount printing blocks and totalizer control means are connected with their respective support in such manner as to be easily and readily replaced by interchangeable elements on adoption of a different fare.

A further object of this invention consists in providing a machine in which the totalizer is operated by the translational movement of the printing block frame through a set of toothed wheels during its travel within the slide.

A further object of this invention consists in providing a machine having a grand total totalizer instead of a sub-total totalizer, whereby the total stored by the machine may be readily checked at any time.

Further features and advantages will be understood from the following description in which reference is made to the accompanying drawings that show, by way of example, a machine more particularly suitable for delivering railway tickets for 500 stations of arrival and embodying ten magazines comprising each fifty printing block frames.

Figure 1 is a perspective view of the machine;

Figure 2 is a perspective rear view;

Figure 3 is a cross sectional view of the machine showing the devices for operating the magazines;

Figure 15 shows a modification in which the statistical counters are mechanically controlled;

Figure 16 is a plan view from the printing side of the block for printing the ticket and fare;

Figure 17 is a plan view of the printing block from the totalizer control side;

Figure 18 is a rear view of the printing block frame;

Figure 19 is a rear view of an attachment plate for the totalizer control members;

Figure 20 shows the two printing blocks for the fare, which amounts to 12,097 in the example shown, formed by uniting together elementary blocks each comprising one figure;

Figure 21 shows the five members in the form of interchangeable bars, reproducing the price or fare on the blocks according to Figure 20 and provided with a number of rack teeth corresponding to their respective figure;

Figure 22 shows a centering ring;

Figure 23 shows the washer for attaching the rack frame to the printing block frame;

Figure 40 is a section on line XL—XL of Figure 35;

Fig. 40a is a partial section of the machine on line AB—AB of Fig. 40.

Fig. 40b is a partial section taken on line CD—CD of Fig. 40.

Figure 41 is a plan view of the ticket blank carrier in two operative positions;

Figure 43 is a section of the totalizer incorporating the numbering mechanism, of the inking pad and date printing device;

Figure 44 is a horizontal section of the printing device for the totalizer card and of the device blocking the totalizer printing mechanism;

Figure 45 is a section on line XLV—XLV of Figure 44;

Figure 47 is a section on line XLVII—XLVII (Figs. 18 and 19) of the ticket printing frame;

Figure 48 is a section on line XLVIII—XLVIII (Figures 18 and 19) of the ticket printing frame.

Figure 4:
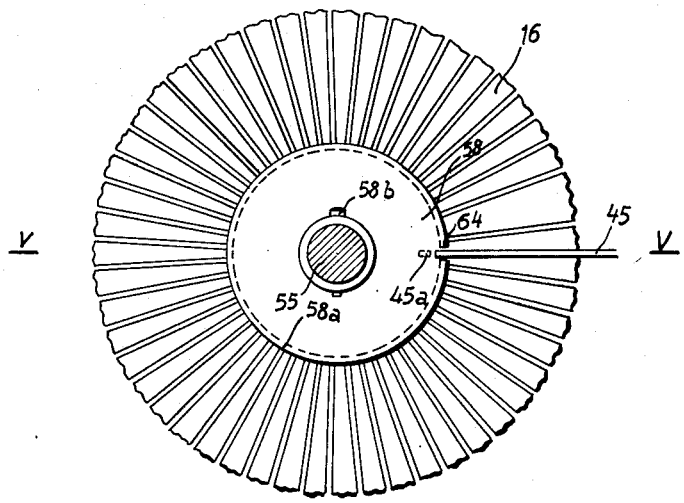
Figure 4 is a part side view of one of the printing block magazines.
Figure 5:
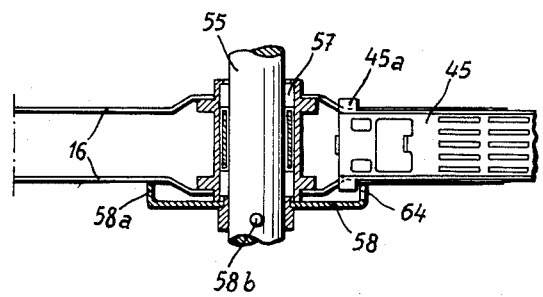
Figure 5 is a section on line V—V of Figure 4.

Referring to Figure 1, 48 denotes the machine base which is provided with three drawers 2 accommodating forms or accessories.

The lid 3 on the right side of the base gives access to the electric control panel and storage battery, if any.

The base supports the machine body A carrying at its upper end the ten handles 6 of the setting levers.

The curved front portion of the body A carries the ten boards 7 carrying the names of the stations of arrival to be selected.

Each board carries in the construction shown the indications relating to fifty stations. Ten slots 8 through which the printing blocks may project, are cut in the rectilinear front portion of the body A.

39 denotes the support for the printing carriage 1, which slides longitudinally on the surface 9. The carriage 1 is formed with an opening 10 for introduction of the blank and issue of the printed ticket, a starting push-button 11, an opening 12 for introduction of the card for the cashed amounts, a plug 13 for fitting the crank for hand operation, a plug 13a for fitting the crank adapted to printing the card for the collected amounts, a lid 14 protecting the discs operating the date printing device and a lid 15, Figure 2, giving access to the control tape.

The rear portion of the machine, Figure 3, carries the panels 4 supporting the statistical counters. A rubber-lined cable 5 ending by a plug contact issues through the frame 48.

Figure 11:
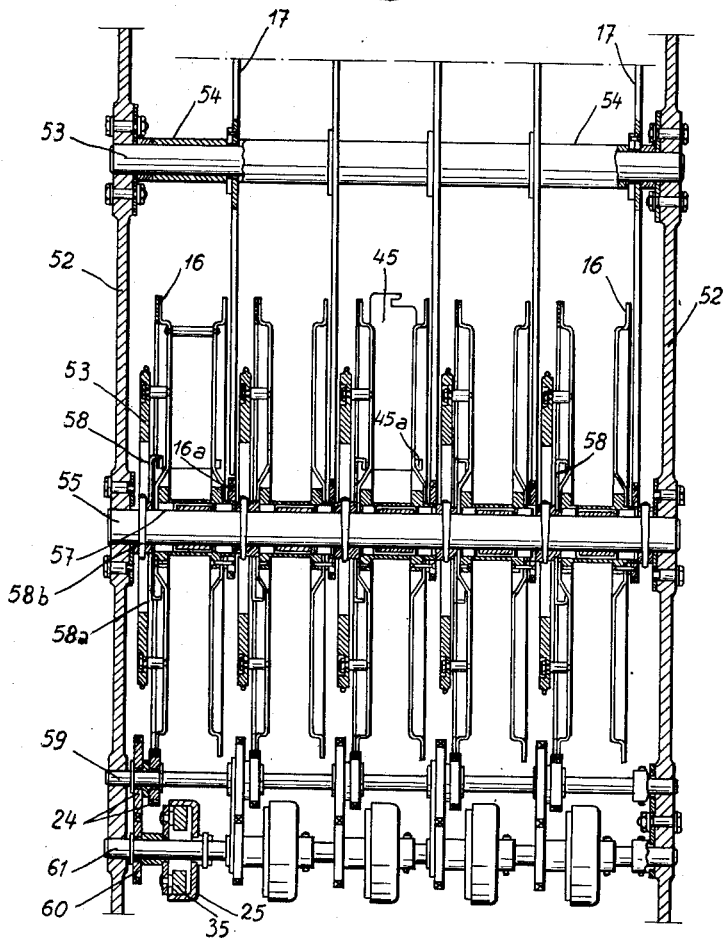
Figure 11 is a section on line XI—XI of Figure 3, limited to one half of the machine, that is, to a set comprising five magazines.
Figure 12:
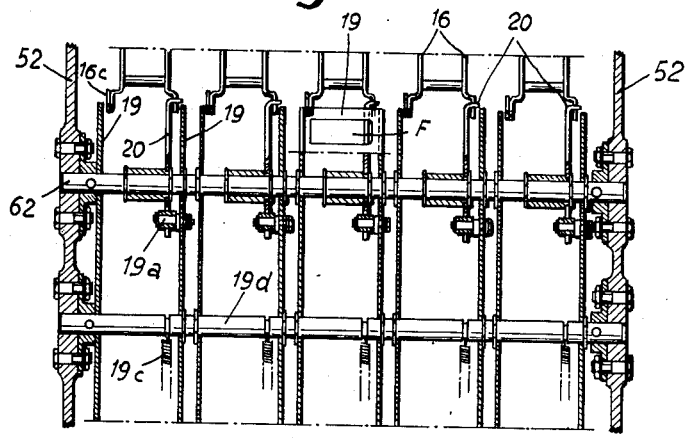
Figure 12 is a similar section on line XII—XII of Figure 3.
Figure 13:
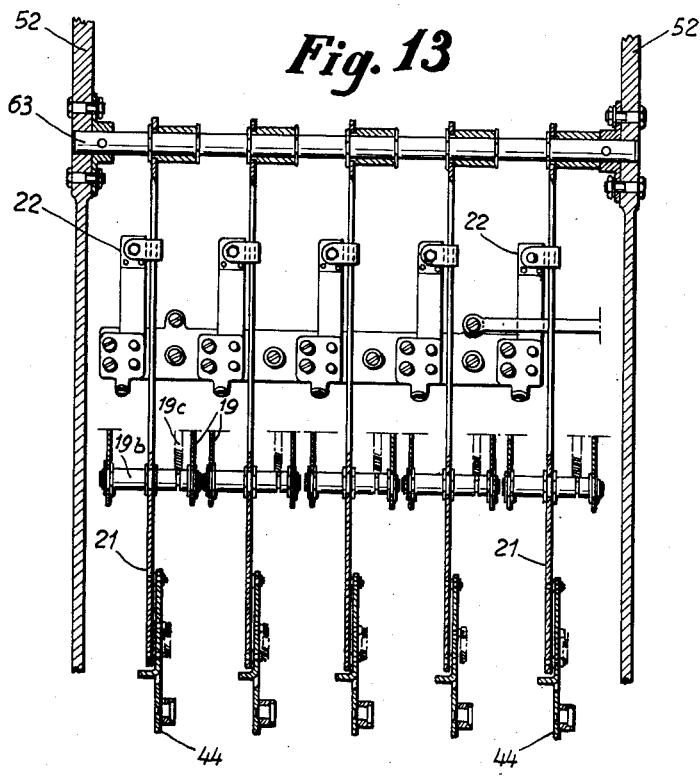
Figure 13 is a section on lines XIII—XIII of Figure 3 and XIII'—XIII' of Figure 9.

Each handle 6 is fixedly connected with a lever 18, Fig. 3, for setting the desired station, which is fixed to a toothed segment 17, of which the hub 54, Fig. 11, is rotatable on a stationary shaft 53 carried by the side walls 52 of the machine body A. Each segment meshes with a wheel 16a carried by the printing block magazine 16. Each magazine is rotatably mounted through rollers 57, Fig. 4, on a stationary shaft 55, the printing blocks 45 being mounted for radial displacement therein. The printing blocks are formed with wings 45a cooperating with the inner edge 58a of cup 58, secured to the shaft 55 by means of a pin 58b, the said edge preventing radial displacement of the printing blocks by centrifugal force and being formed with a notch 64 arranged horizontally in front of the opening 8, in order to permit issue of the printing block on extraction by the printing mechanism.

A lever 29 is hinged in each handle about a pivot 29a and is provided with a return spring 29b, the lever 29 acting on a slide 31 axially guided in the lever 18. The slide 31 is engaged by its wedge-shaped end by notches 30a in a stationary segment 30, thereby retaining the setting lever in the fifty positions corresponding to the positions which may be taken by the magazine 16 as it brings each printing block 45 in front of the outlet opening 8.

19 denotes the slidable closing element for the opening 8 through which the printing blocks may issue.

The element 19, of which the opening is denoted by F, carries a pivot 19a engaged by a slot 20a in a lever 20 rotatable on a spindle 62 and provided with an extension 20b, which, by cooperating with a set of teeth 16c in the magazine 16, serves as feeler and aligner member for the magazine. The member 19 is hinged below at 19b to an operating lever 21, rotatable about an axis 63 and provided with a return spring 19c anchored to a spindle 19d. The lever 21 further actuates the electric contact 22 controlling the statistical counters 26.

The magazine carries a toothed rim 23 meshing with a double pinion 24 rotatable about a spindle 52 and actuating in turn through a gear wheel 60 the rotating member of a centrifugal brake 25, which rotates on a spindle 61. The board 4 supporting the statistical counters 26, carries a switch 27 for the lamps illuminating the setting boards 7, operated by a finger 28 fixedly connected to the setting lever 18, so that the lamp illuminating the desired station of arrival is extinguished when the setting lever is in its inoperative position.

A toothed wheel 33, fixedly connected with the printing block magazine 16, drives a sprocket chain 32 (Fig. 6) travelling over idle pulleys 32a, 32b, 32c and is fixed to the slidable member 34 carrying the electric contact operating the statistical counters 26.

Figure 6:
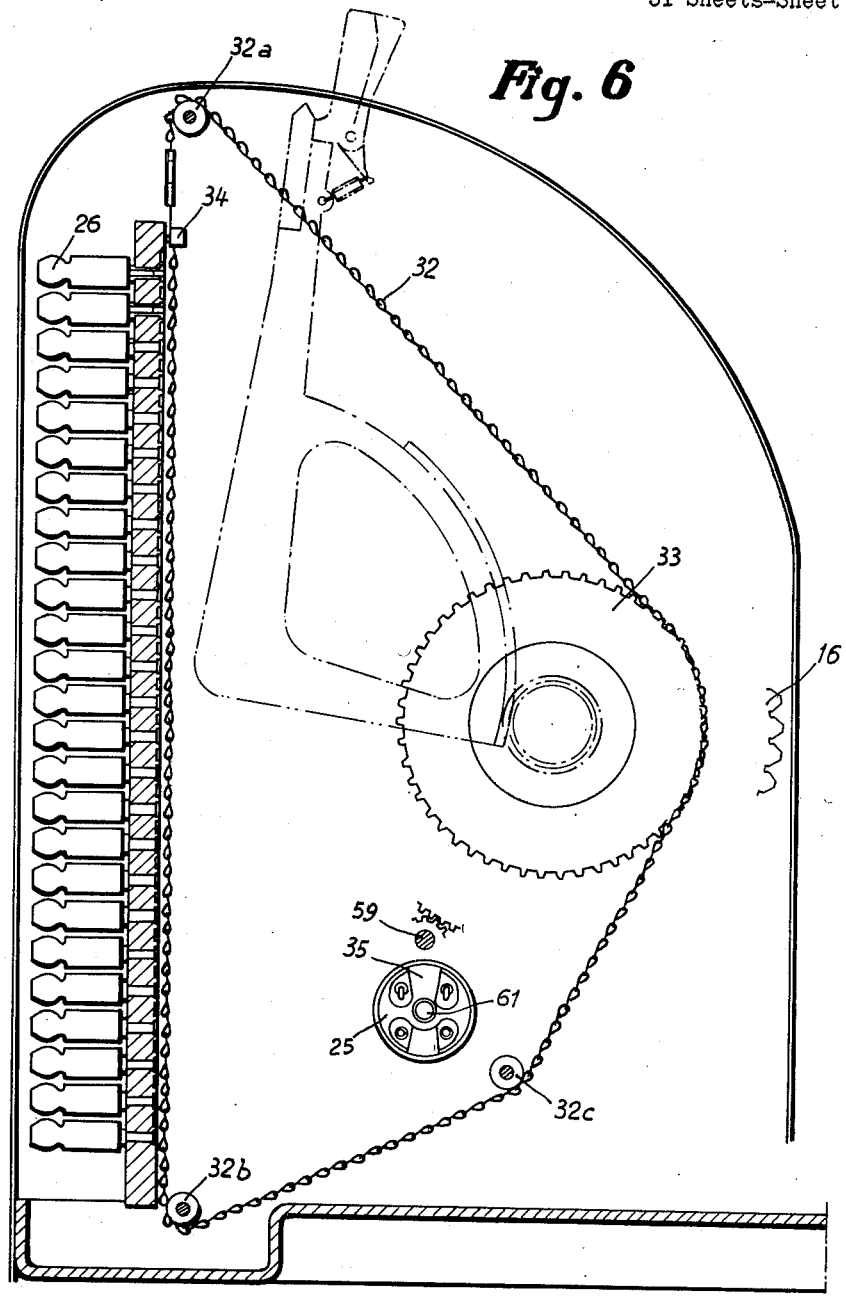
Figure 6 is a cross section of the machine showing the device for controlling the statistical counters.

An inside view of the centrifugal brake 25 is visible in Figure 6, said brake embodying two expanding brake shoes 35 lined with friction material.

Figure 7:
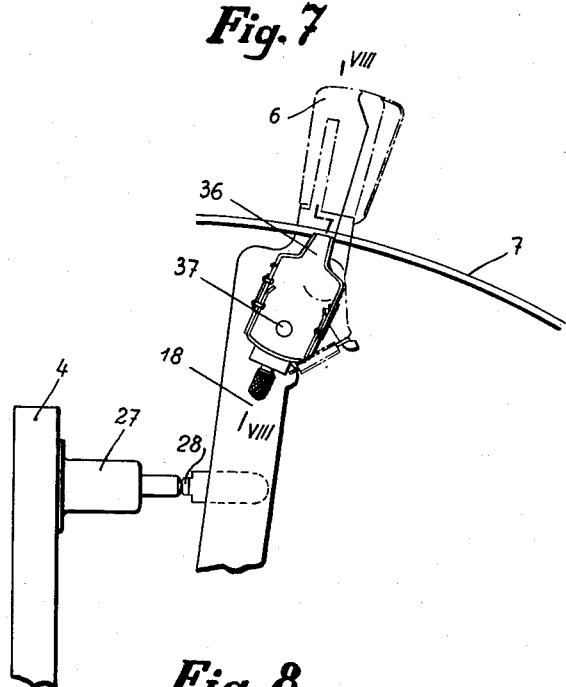
Figure 7 shows a detail of one of the setting levers in part sectional side view.
Figure 8:
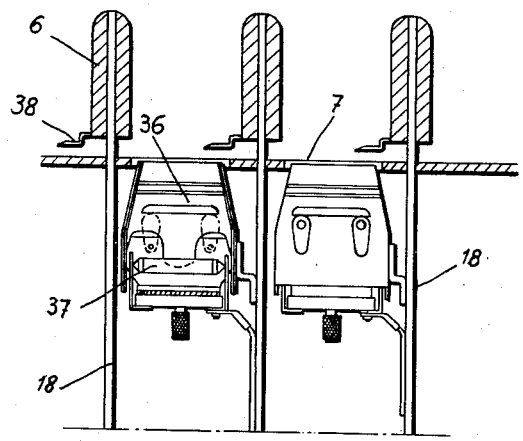
Figure 8 is a section on line VIII—VIII of Figure 7.

The upper end of each setting lever 18 has fixed thereto a casing 36 (Figures 7, 8) which supports a source of light illuminating the setting boards 7.

The handle 6 for the setting lever 18 carries below a pointer 38 which assists in setting the station of arrival.

40 (Figures 9, 10) denotes the carriage supporting the printing slide 1, provided with four ball bearings 41 for longitudinal displacement on the guide surface 9 and two bearings 42 for longitudinal electric contact for actuating the printing slide motor.

43 denotes a forked lever, rotating on a spindle 43a and actuating a resilient hooked safety lever 44 mounted for oscillation on the end of the lever 21.

Figure 9:
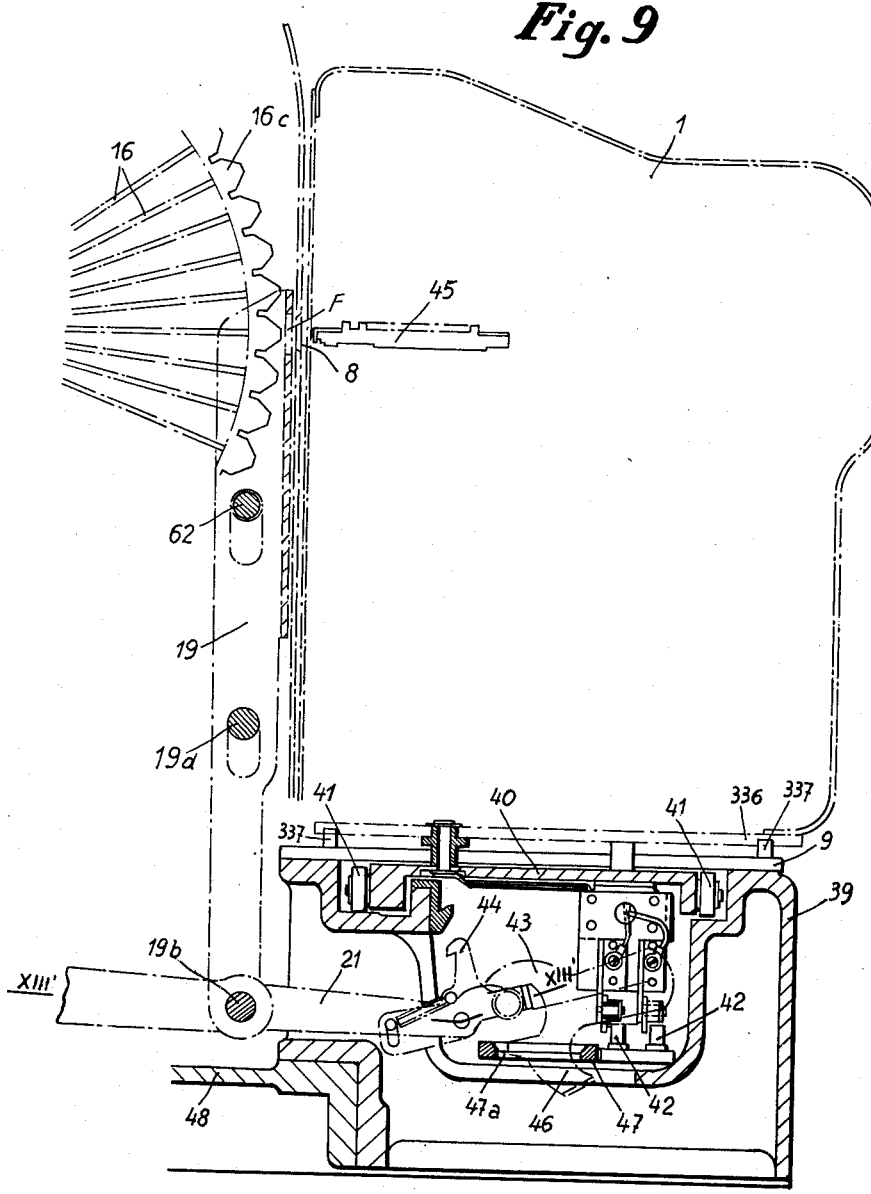
Figure 9 is a cross section of the support for the printing slide in the position in which the printing block is extracted.

In Figure 9, the forked lever 43 is shown in the position in which the slide 19 uncovers the slots 8 and the printing block 45 is extracted. The lever 43 carries at its lower end a finger 46 which fits within the slots 47a in the longitudinal cross member 47, screwed to the support 39, and acts as aligner for the printing slide 1 with the shaft of the printing block magazine 16.

Figure 10:
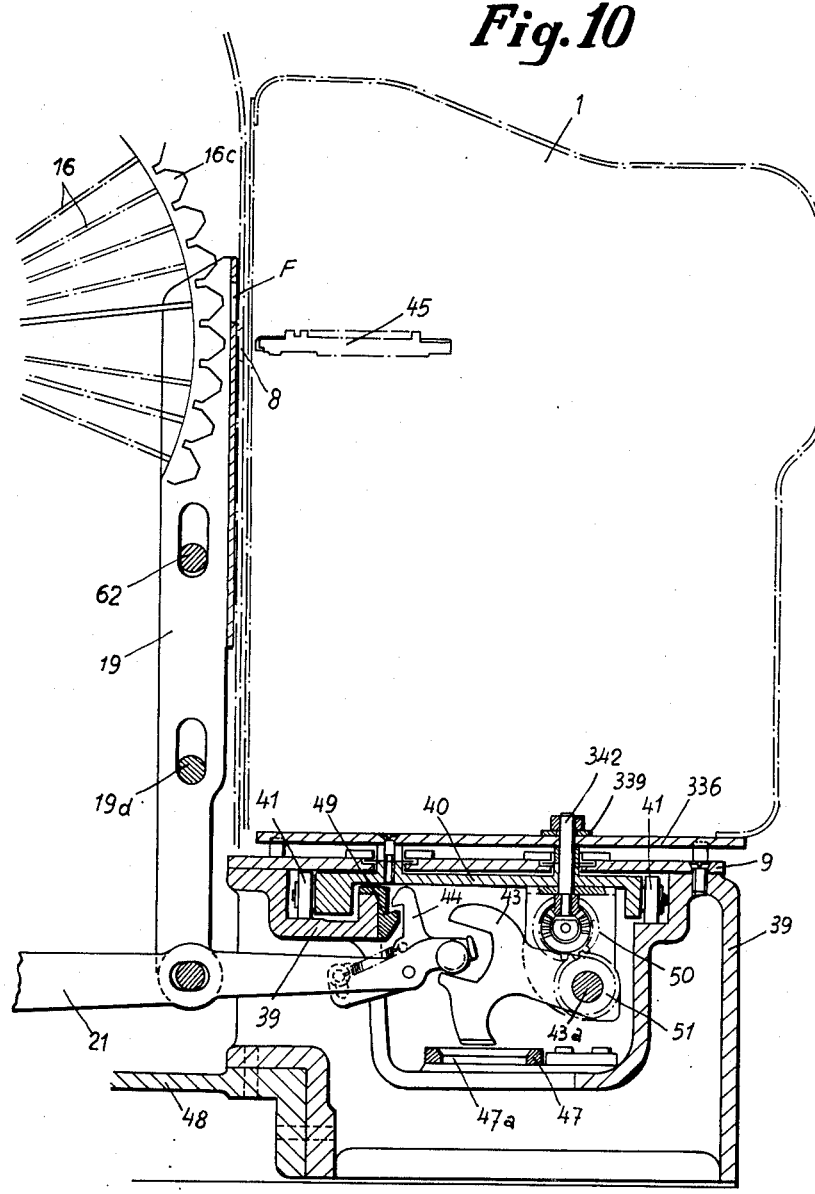
Figure 10 is a section similar to Figure 9 in the inoperative position.

In Figure 10, the forked lever 43 is in its inoperative position and the hooked lever 44 is in engagement with the stop 49 fixed to the support 39. This figure shows the transmission of motion to the forked lever 43. Motion is transmitted from the push-button 11 over various members which shall be described hereafter, to the toothed segment lever 339 rotating on the plate 336 for the slide about the shaft 342 down to the toothed wheels 51 rotating on the spindle 43a together with the lever 43 over a pair of bevel pinions 50.

Figure 14:
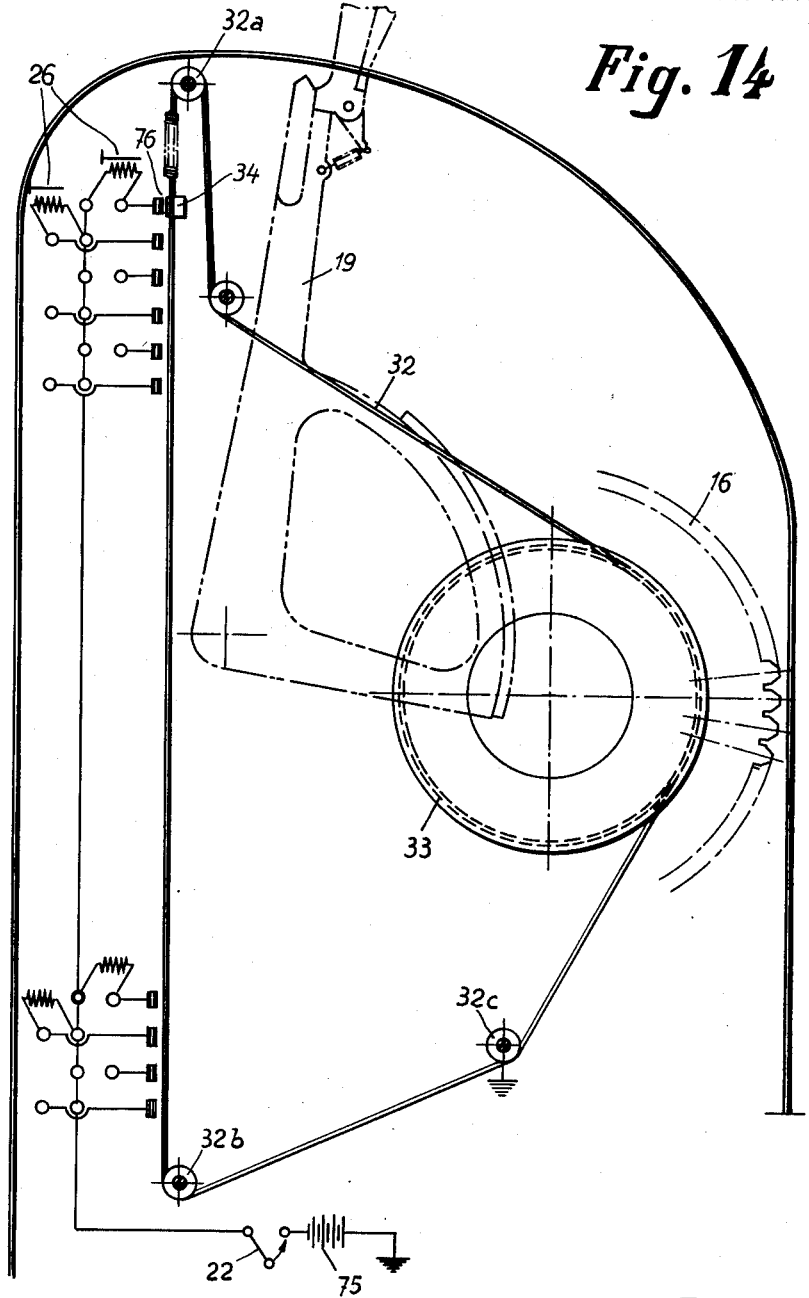
Figure 14 is an electric diagram showing the statistical counter control.

In the diagram shown in Figure 14, 75 denotes a battery, of which the negative pole is earthed. The sprocket chain is also earthed over the pulley 32c. A slide 34, carried by the sprocket chain, moves in front of the contacts 76 carried by the panel 4 supporting the electric counters 26 which are diagrammatically shown as relays. The circuit of each relay is closed by a contact 22 actuated by the above described lever 21.

In the modification shown in Figure 15, the lever 21 is provided with an extension 21a to which a rod 78 is hinged. The rod 78 has hinged thereto two bell crank levers 79a, 79b rotating on spindles 56a, 56b, respectively. A rod 77 is hinged to the other end of levers 79a, 79b. The sprocket chain 32 carries a resilient tappet 34a which moves in front of the extensions 26b controlling the statistical counters 26a carried by the panel 4.

On swinging for clearing the opening 8, the lever 21 moves upwardly the rod 78, thereby rotating anti-clockwise the levers 79a, 79b and moving the rod 77 horizontally from the right to the left, the resilient tappet 34a abutting the extension 26b of the statistical counter in register therewith.

Referring to Figures 16 to 23 and 47, 48—65 denotes the racks controlling the totalizer gears corresponding to numerals 1, 2, 9 and 7; 65a denotes the smooth bar corresponding to zero, while 66 denotes the plate formed with five sets of seatings 66a for the racks.

45 denotes a printing block frame having secured by means not shown in the drawing on one face a printing ticket block. Said ticket printing block is formed with dovetailed recesses 45b for the block 67 printing the fare.

The racks 65 are interchangeable and reproduce the fare on the blocks 67. For this purpose, the racks are provided with a variable number of teeth 1 to 9 in accordance with the significant numeral to be recorded. When this numeral is 0, the rack is a mere smooth bar, as the central bar 65a in Figure 17 between racks 65 with 1, 2, 9 and 7 teeth, respectively, the whole set reproducing, by way of example, the numeral 12097.

Both the fare block unit 67 and bars 65, 65a are retained in their seatings between the plate 66 and frame 45 when the latter are connected together.

For this purpose, the plate 66 is formed with hooks 68a, 68b for connection with the cross members 45c, 45d, respectively, of the frame 45, and with a pin 69 engaged by the dovetailed recess 70 in the frame 45. Moreover, the plate 66 is provided with a pin 71 on which fits the centering ring 72, abutting the arcuated central portion of the edge of the cross member 45c of the frame 45, and which is retained by the clamping washer 73. The frame 45 is further provided with a gripping tooth 74.

The change in fare is rapidly effected by the following process.

(1) The clamping washer 73 and centering ring 72 are removed from the pin 71;

(2) The plate 66 is moved upwardly till the hooks 68a, 68b are cleared of the retaining cross members 45c, 45d and the pin 69 is disengaged from the dovetailed recess 70 in the printing block frame 45.

(3) The racks 65 and bars 65a are removed from the seating 66a in the plate 66c and are replaced by racks and bars showing the desired changed fare.

(4) The blocks 67 are removed from their seatings 45b and replaced by further blocks for the desired fare.

The printing slide 1 shall now be described. In the upper portion of Figure 24, 80 denotes the set of toothed wheels advancing the serial number recording mechanism 81 visible from the outside on the upper face of the slide. The toothed wheels 80 also actuate through a toothed wheel 82 the spindle 82a of the numbering mechanism 253 (Figure 38) printing the control tape 83. The two numbering mechanisms are actuated by one control by rotation through 360° of the spindle 197.

Figure 24:
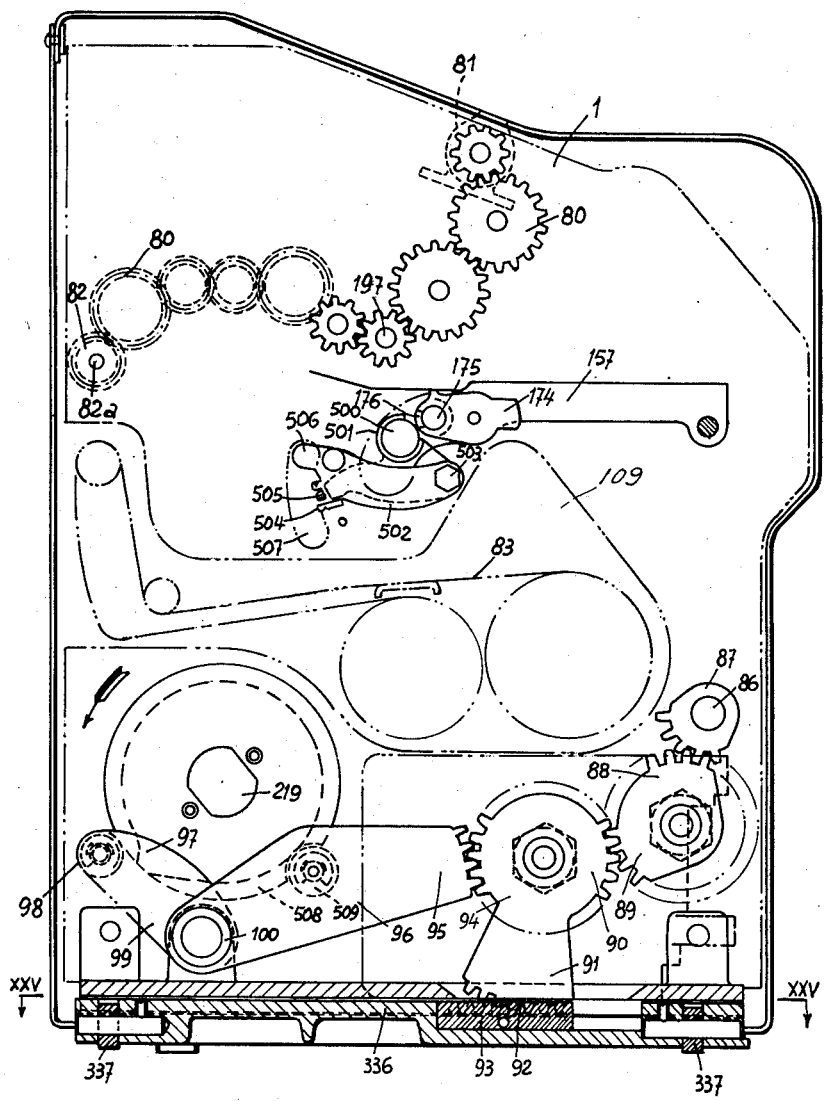
Figure 24 is a sectional view of the printing slide showing the control for the opening through which the printing blocks are extracted, the path of the control tape, the transmission for driving the numbering mechanisms, the inking device for the pads and the visual numbering mechanism.
Figure 25:
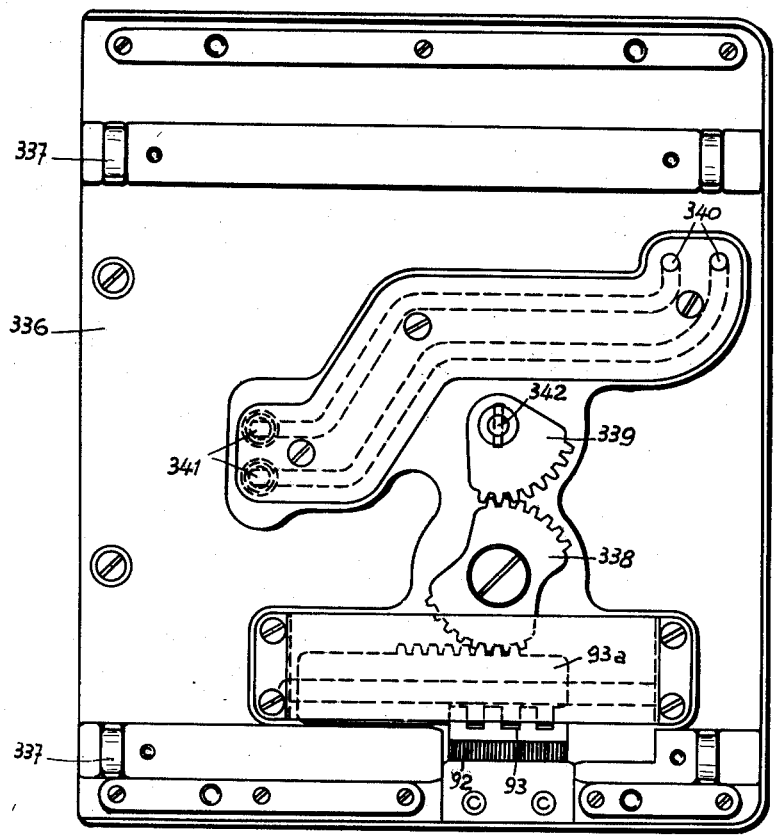
Figure 25 is a section on line XXV—XXV of Figure 24, showing the slide plate for the printing mechanism.

The central portion of Figure 24 diagrammatically shows the path of the control tape 83 which is mounted on the frame 109 (Fig. 25). Directly above, the mechanism for supplying ink from the outside to the inking rollers 176 is shown, said rollers rotating on a shaft 175 pivoted to a resilient lever 174 hinged in turn at its front end to a blank carrier 157.

The roller inking mechanism consists of a removable pad 500 on the left side of the slide, which is fitted into a case 501 connected to a frame 502 rotating on a pivot 503 and solidly connected by means of a crank 504 and spring 505 to an arm 506, which is lifted from the outside along the slot 507 cut in the left side wall of the printing unit.

The above mechanism operates as follows. After inking the removable pad 500, the latter is fitted into the case 501, the arm 506 is lifted over its full stroke and the pad 500 is rotated by hand by acting on a milled button. Resilient adherence of the pad 500 against the rollers 176 results in the desired inking.

The lower portion of Figure 24 shows the gearings for actuating by means of the starting push button 11, Figure 1, the fork 43, Fig. 9, for opening and closing the opening 8 for the printing blocks.

The movement is performed as follows. By fully depressing the push-button 11, Figures 35, 36, 37, the rod 11a connected thereto causes the release link 84 to recede through the slide 286 and finger 287 cooperating with the slide through a slot. Displacement of the link 84 rotates through pivot 211 the toothed segment 85a clockwise, the segment 85a meshing with the toothed segment 85b which is rotated anti-clockwise together with the spindle 86. The latter has keyed thereon a toothed segment 87, Figure 24, meshing with the toothed segment 88. The latter carries a further set of teeth 89 meshing with a toothed segment wheel 90 having cut therein at its lower end a further toothed segment 91. The latter meshes with a rack 92 in the slide 93 which is moved backwardly.

The slide 93 is provided with a lateral set of teeth driving a further slide 93a, Figure 25, actuating through a toothed segment wheel 338 a toothed segment 339, of which the spindle 342 actuates through the drive shown in Figure 10 the fork 43.

Figure 25 shows in plan view the bearing plate 336 for the printing slide provided with four rollers 337 for longitudinal displacement on the surface 9 (Fig. 1). The right-hand portion of Figure 25 shows the path of cables 340 from the electric equipment arranged behind the lid 3, Figure 1, which lead electric current to two plates 341 abutted by two resilient contacts arranged under the slide base.

The toothed segment wheel 90 is formed with a third toothed segment 94 meshing with a toothed segment 95 in a lever 96 which retains the wheel 90 in its open position during the time required for extracting and retracting the printing block.

While the cam 508, fixedly connected with the main shaft 219, acts on the roller 509 over nearly all the period of the cycle, the cam 97 comes into action towards the end of the latter and acts on the roller 98 of the lever 99 fixedly connected with the lever 96 through the hollow spindle 100, returning the lever 96 and the slide 93.

Figure 26:
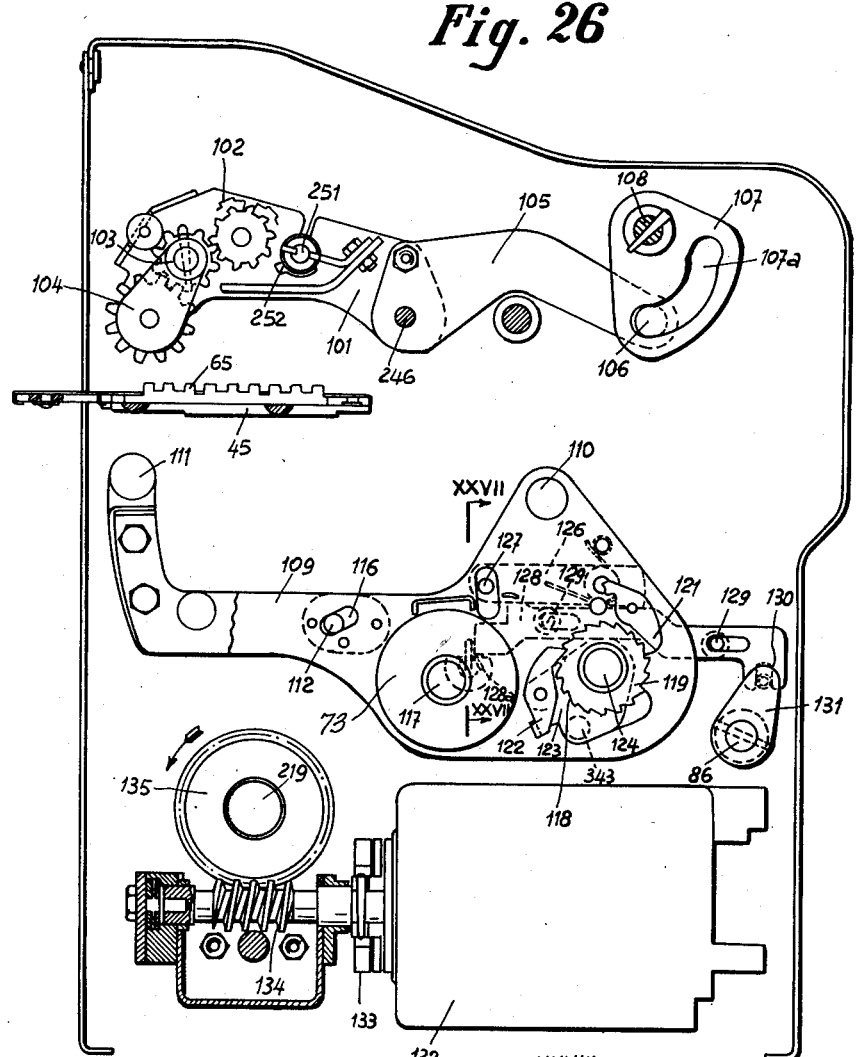
Figure 26 is a section on line XXVI—XXVI of Figure 42, showing the totalizer and control therefor, the printing mechanism for the control tape and paper feeler mechanism.

The upper portion of Figure 26 shows in side view the totalizer unit in its inoperative position. The unit consists of a frame 101 carrying the shafts for the numeral pinion set 102 for the intermediate wheels 103 for the pick-up wheels 104 meshing as the printing block is extracted with the racks 65 on the frame 45. Said frame carries also the ten transfer cams 252 rotating on the spindle 251.

The frame 101 oscillating on the shaft 246 is fixedly connected with an arm 105 carrying at its end a pivot 106 seated in a cam shaped slot 107a in the lever 107 keyed on the shaft 108 which, as will be explained hereafter, is actuated by the camshaft 219.

Figure 29:
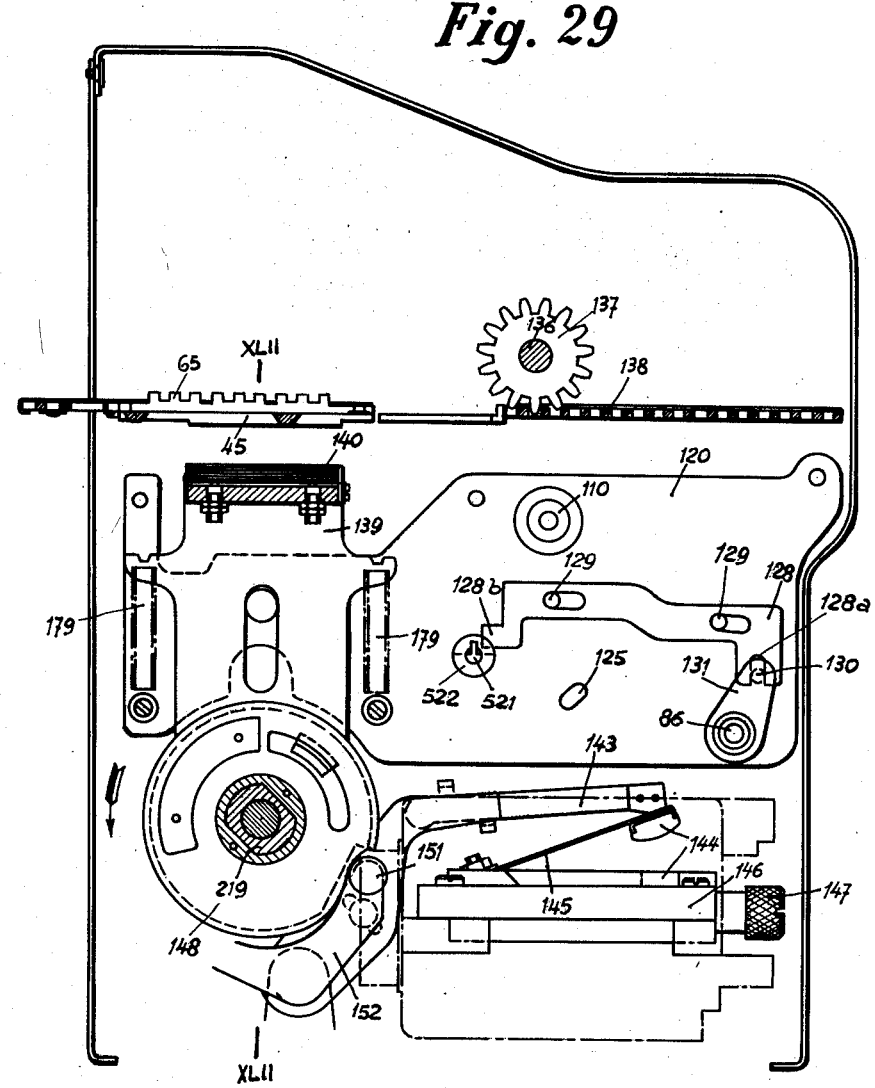
Figure 29 is a section on line XXIX—XXIX of Figure 42, showing the printing block extractor, the hammer cooperating with the printing block and release mechanism for actuating the electric motor.

The central portion of Figure 26 shows a section of the frame 109 carrying the control tape, which rotates on the pivot 110 fixedly connected with the central wall 120, Figure 29. 111 denotes the pressure roller for printing the control tape through the action of the pivot 112 seated in slot 116 in the frame 109.

Figure 42:
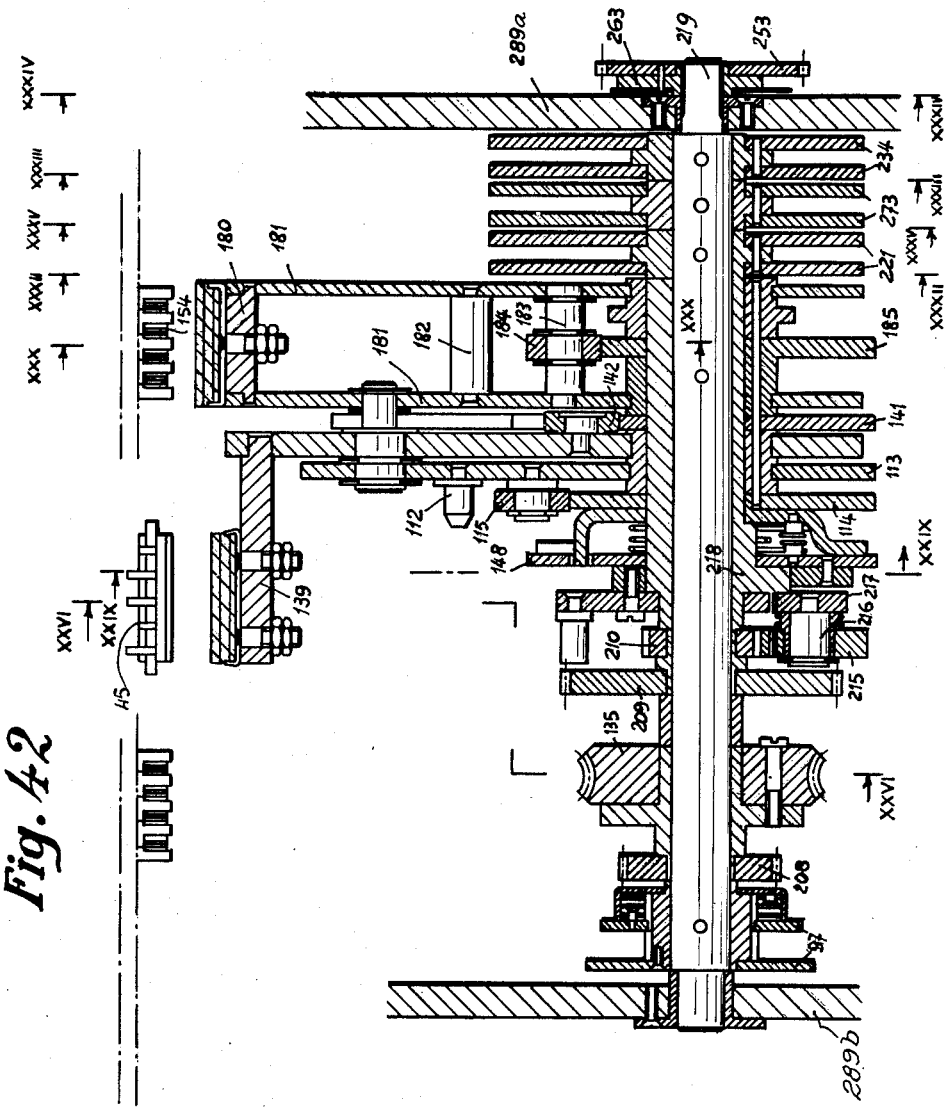
Figure 42 is a section on line XLII—XLII of Figure 29, of the main camshaft and devices for printing the serial number, date and fare.

As visible in Figure 42, the pivot 112 is fixedly connected with a strut 113 actuated by the cam 114 through the roller 115.

The control tape roll 73 to be printed is fitted on the pivot 117, the tape travelling along the path shown in Figure 24 and winding on the pivot 118 fixedly connected with a ratchet wheel 19 provided with a resilient reversing pawl 121.

The control tape 83 is fed through a resilient feed pawl 122 rotating on a pivot 122a fixed to the lever 123. The latter rotates on a pivot 124 secured to the frame 109 and carries pin 343 received by the slot 125 (Figure 29) in the central wall 120.

Figure 27:
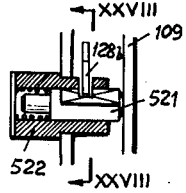
Figure 27 is a section on line XXVII—XXVII of Figure 26.
Figure 28:
Figure 28 is a section on line XXVIII—XXVIII of Figure 27.

A resilient feeler 126 for the control tape rotates on a pivot 126a secured to the frame 109. In case of breakage or exhaust of the tape the feeler rotates anticlockwise, preventing by its finger 127 the forward movement of a slide 128 guided on the wall 120, Fig. 29, by two pivots 129 riveted thereon. The slide 128 is connected by means of a slot 126a and a pivot 130 to a lever 131 keyed on the spindle 86 preventing rotation of the spindle and operation of the machine. The slide 128 further carries an extension 128b abutting a resilient pivot 521, Figures 27, 28, enclosed in a bush 522 if the control tape frame is not in its proper position. In this case also displacement of the slide and operation of the machine is prevented.

The lower portion of Figure 26 shows the motor 132 driving a coupling 133 a worm screw 134 meshing with a worm wheel 135 loosely mounted on the main shaft 219.

Figure 29 shows the spindle 136 secured to the toothed wheel 137 meshing with the slide 138 serving to extract the printing block from and return it into the magazine 16.

139 denotes the hammer provided with a rubber pad 140 for printing the ticket.

The hammer 139 is lifted by means of the cam 141, Figure 42, which acts on the roller 142 secured to the hammer, and is returned by springs 179.

The lower portion of Figure 29 shows the snap-action device for actuating the electric motor, which consists of a resilient lever 143 which, by lowering, brings into contact two carbons 144 secured to a spring leaf 145 and switch 146, respectively, the switch being provided with a fuse 147.

The resilient lever 143 is lowered by means of a cam 148 resiliently connected to the main spindle 219. The cam is set free at the end of the stroke of the push button 11 by a strut 149, Figure 31, secured to the spindle 150. The cam 148 acts on the roller 151 of the lever 152 secured to the resilient lever 143 by an adjustable lock device.

Figure 30:
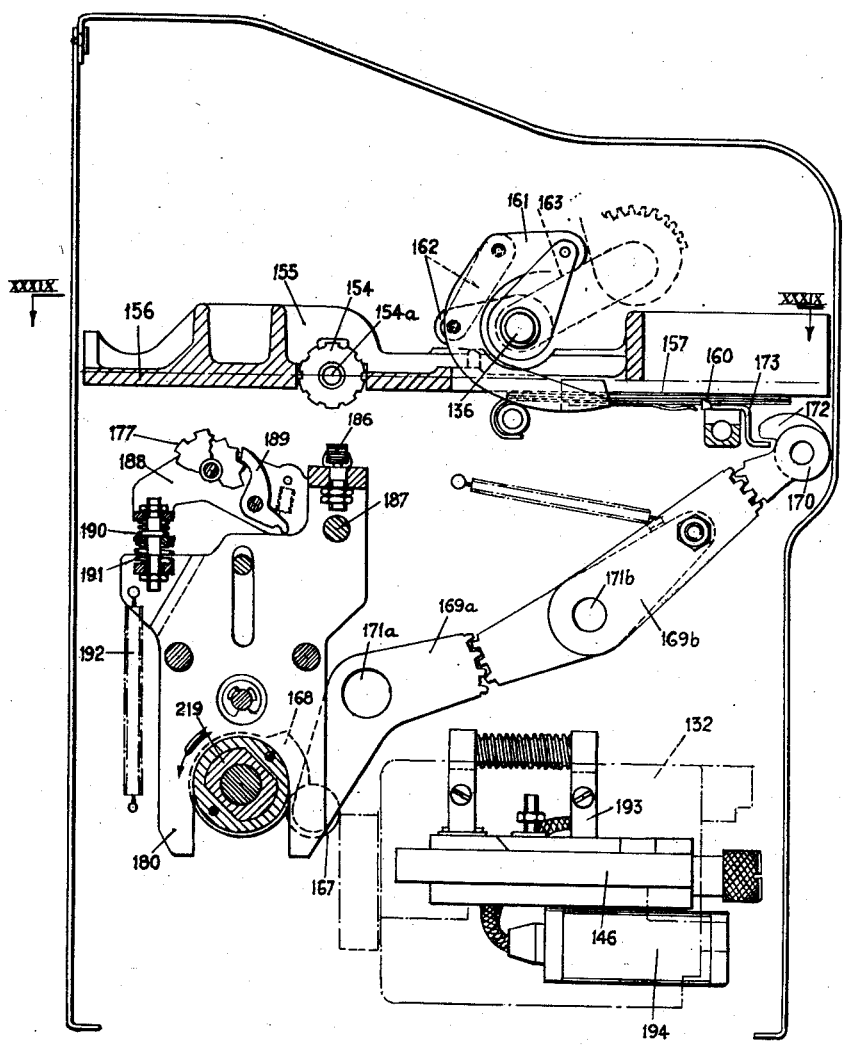
Figure 30 is a section on line XXX—XXX of Figure 42, showing the ticket numbering mechanism, ticket extractor and date printing device.

Figure 30 shows the mechanism 154 for serial numbering of the ticket, rotating on a spindle 154a supported by a bracket 155 of the top plate 156 of the printing slide.

On the right of the mechanism a ticket blank carrier 157 is visible, which slides in a transverse direction on two spindles 158, Figure 41, of the frame 159. The carrier 157 is provided with a resilient tooth 160 retaining the ticket to be printed. During introduction of the latter, the ticket expelling lever 161 is caused to recede and the set consisting of the link and lever 162 secured to the hollow shaft 163 rotating on the shaft 136 is lifted.

Figure 33:
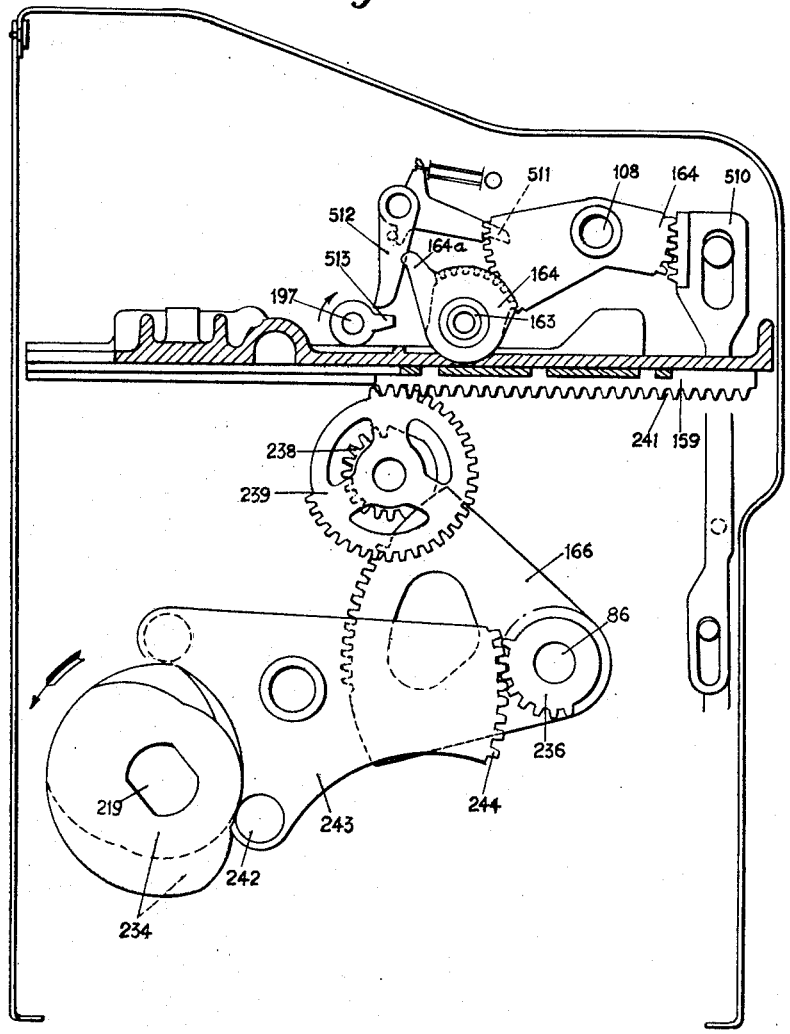
Figure 33 is a sectional view on line XXXIII—XXXIII of Figure 42 showing the mechanism for advancing and returning the ticket blank carrier.
Figure 36:
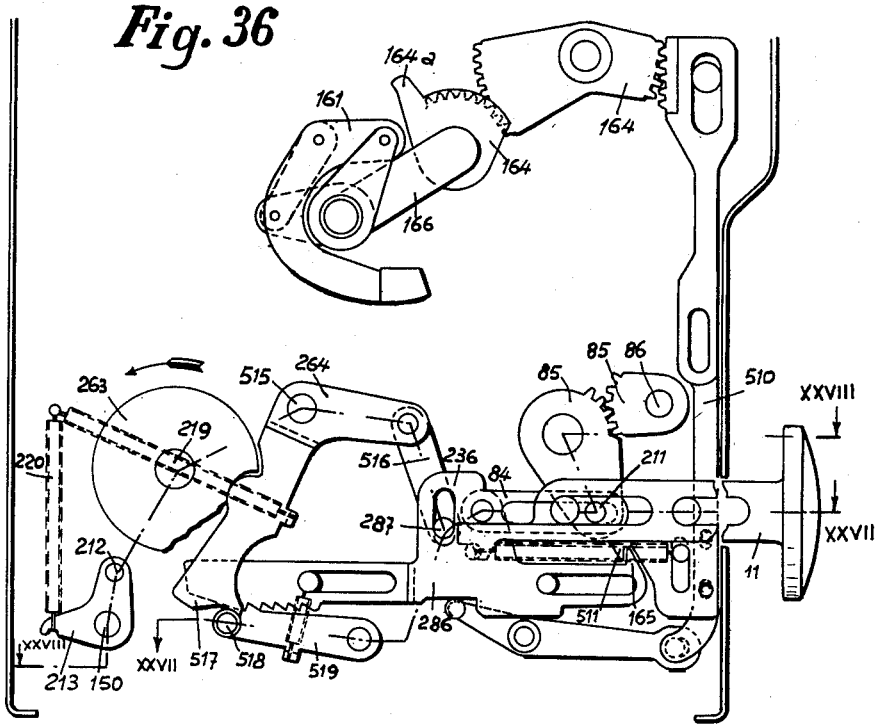
Figure 36 shows the transmission from the push-button for starting the machine.

The hollow shaft 163 rotates the two toothed segment levers 164, Figure 33, lifting the link 510 which carries a hook 511, Figure 36, abutting the feeler tooth 165 till the card reaches the end of the stroke.

The feeler 165 is connected through the slide 286 and pivot 287 to the push-button 11. Consequently, the machine cannot be started till the ticket blank has been fully introduced.

Release of the printed ticket takes place as follows. Just before the end of the cycle the cam 168, figure 30, acts on the roller 167 which rotates through the levers 169a, 169b loosely mounted on the pivots 171a, 171b the lever 170 and lowers its hook 172 cooperating with the crank 173 of the resilient tooth 160.

The printed ticket may now follow the thrust of the resilient ticket expelling lever 161 and reaches the opening 10, Figure 1, for introduction of the card.

180 denotes the printing hammer for the serial numbering mechanism 154. The hammer 180 comprises two side walls 181, Figure 42, connected by spacers 182 and carrying a pivot 183 on which the roller 184 rotates for transmitting the lifting movement received from the cam 185. A press pad 186 in Figure 30, of the ticket numbering mechanism is fixed to the hammer. A frame 188 of the date stamp 177, which is provided with resilient positioning levers 189 rotates about the pivot 187.

For resilient inking of the date stamp the frame 188 is pushed upwardly by a spring 190. The date is resiliently printed by virtue of the spring 191 acting in series with the spring 190 on the frame 188. The hammer 180 is returned downwardly by the spring 192.

Figure 46:
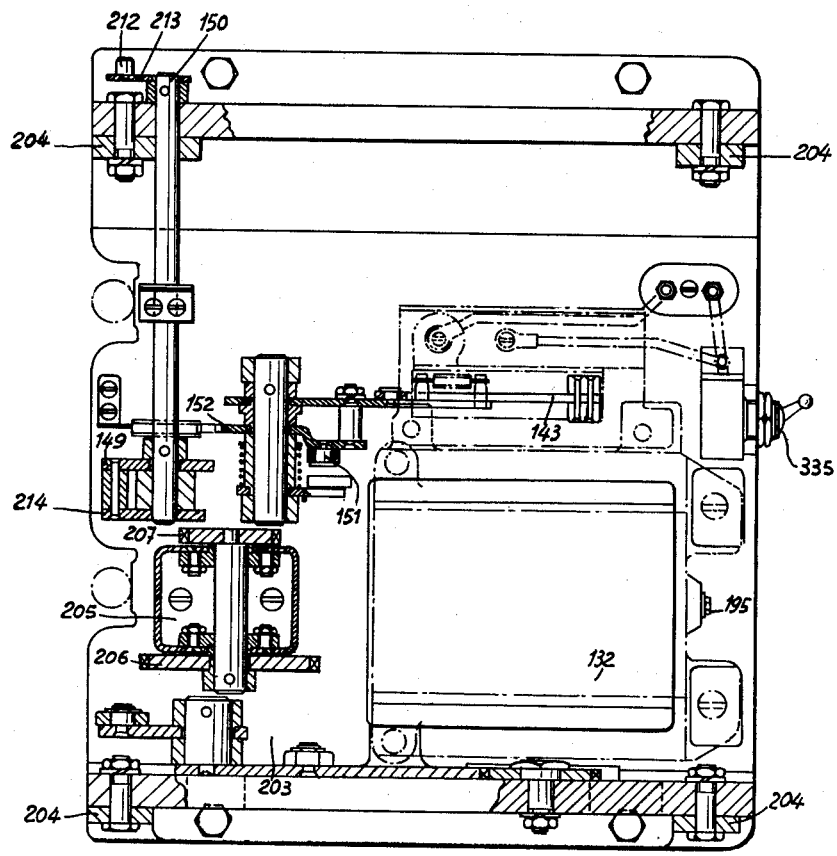
Figure 46 is a horizontal section of the printing slide showing the frame with the motor and controls therefor.

The lower right side of Figure 30 shows the resistance 193 and oil condenser 194 for damping the spark of the centrifugal governor 195, Figure 46, of the motor 132. The resistance 193 and condenser 194 are secured to the switch 146, Figure 29.

Figure 31:
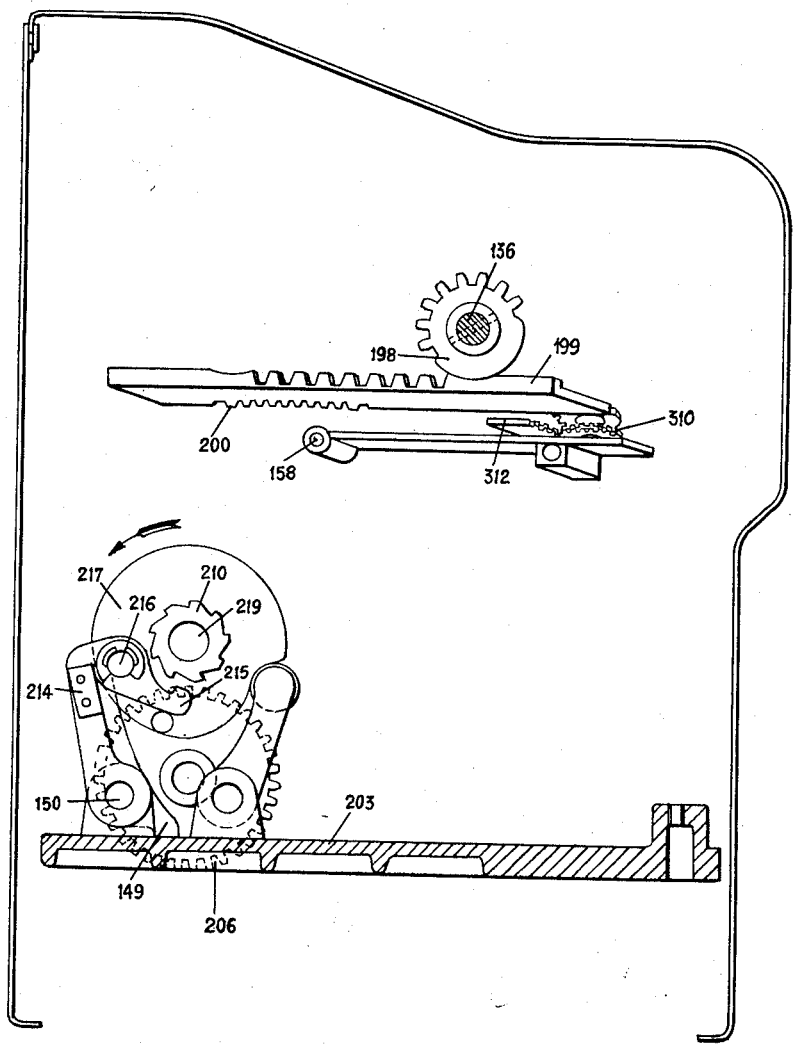
Figure 31 is a part perspective view of the control device for displacing the ticket carrier and a part sectional view of the device for releasing and setting in motion the main camshaft.

The upper portion of Figure 31 shows the intermittent wheel 198 keyed on the shaft 136 which moves forward and backward the slide 199 provided with a rack 200, see also Figure 40, which produces the timely displacement from the right to the left, and vice versa, of the ticket blank carrier 157, Figure 41.

The lower portion of Figure 31 shows the base 203 of the printing slide to which the side walls of the slide are secured by means of bolts and nuts arranged in the four angle projections 204, Figure 46.

The case 205, Figure 46, is secured to the base and carries rotatably mounted on its side walls the shafts of the worm screw 134, Figure 26, and of the toothed wheels 206, 207, Figure 46. The latter connect the worm wheel 135, Figure 42, fixedly connected to the toothed wheel 208, to the toothed wheel 209 fixed in turn to the ratchet wheel 210.

Figure 37:
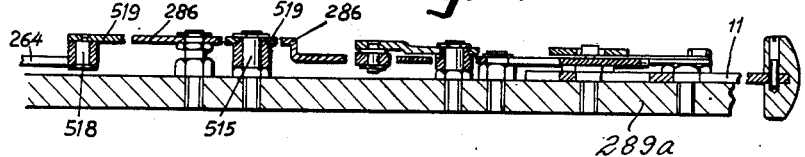
Figures 37 and 38 are two sections on lines XXXVII—XXXVII and XXXVIII—XXXVIII of Figure 36, respectively.
Figure 38:
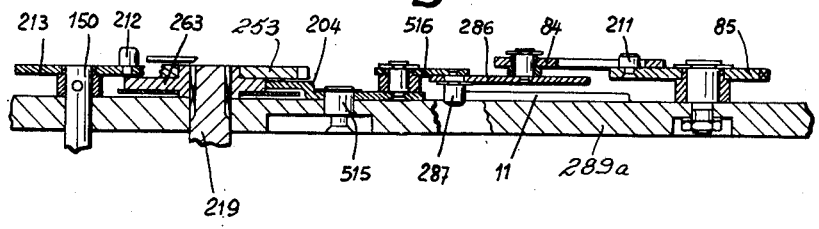

By acting on the push-button 11, Figures 36, 37, 38, the shaft 150 is rotated by the lever 213 splined thereon, the pivot 212, slide 286 and pivot 287. The shaft 150 is fixedly connected to the strut 214, Figure 31, cooperating with the tail of the resilient pawl 215, Figures 31 and 42, rotating on the pivot 216 riveted to the disc 217 which is solidly connected with the bush 218, Figure 42, splined on the main shaft 219. The driving cams 114, 141, 185 are splined to the bush 218.

The spindle 150 is returned to the inoperative position through the spring 220, Figure 36.

Figure 32:
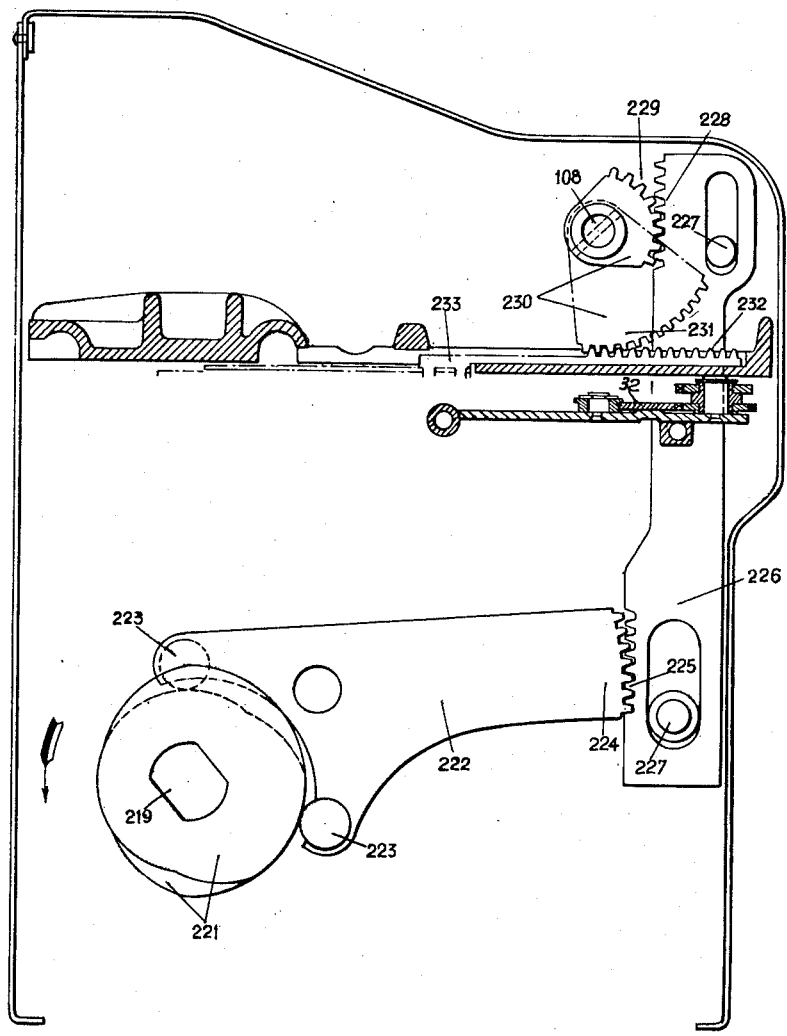
Figure 32 is a section on line XXXII—XXXII of Figure 42, showing the device for coupling the totalizer and engaging the printing block.

The totalizer is clutched in and out, Figure 26, by means of a double cam 221, Figure 32. The cam reciprocates the lever 222 provided with rollers 223. The lever 222 carries at its right end a toothed segment 224 meshing with a rack 225 of the pull rod 226 which slides on the right side of the printing mechanism and is retained by two pivots 227 riveted on the right side of the printing mechanism.

The pull rod 226 carries at its upper end a further rack 228 meshing with the toothed segment 229 of the double-armed lever 230 keyed on the shaft 108.

Oscillation of the shaft 108 operates through the devices described with reference to Figure 26, lever 107, slot 107a, pivot 106, arm 105 the totalizer 101.

The double-armed lever 230 carries at its lower end a further toothed segment 231 meshing with a rack 232 of the slide 233 releasing the printing block. The operation of this member will be described hereafter.

The upper portion of Figure 33 shows the gears driving the feeler described with reference to figure 30 preventing release of the machine when the ticket blank has not been fully introduced.

As the hollow shaft 163 completes its rotation, the end 164a of the first lever 164 is engaged by the projection 511 on the double-armed lever 512. Just before the end of the cycle, the cam 513 secured to the shaft 197 of the ten transfer mechanism, see also Figure 34, strikes against the lower arm of the lever 512 and releases the projection 511 from the end 164a of the lever 164 which is free to resume its inoperative position carrying along the pull rod 510.

The lower portion of Figure 33 shows the gearings moving forward and backward the double cam 234 of the frame 159, see also Figure 41, provided with the two shafts 158 on which slides the ticket blank carrier 157.

Operation is as follows. Upon release of the machine, the lever 243 provided with rollers 242 riding on the cam 234 receives from the latter an upward movement which is transmitted over the toothed segments 244, 236 to the toothed segment 166 secured to the segment 236.

The segment 166 then rotates anticlockwise the intermittent wheel 238 secured to the wheel 239 which meshes with the rack 241 on the frame 159 that is pushed into the printing mechanisms. The frame 159 is returned by the reverse effect of the counter-cam 234.

Figure 34:
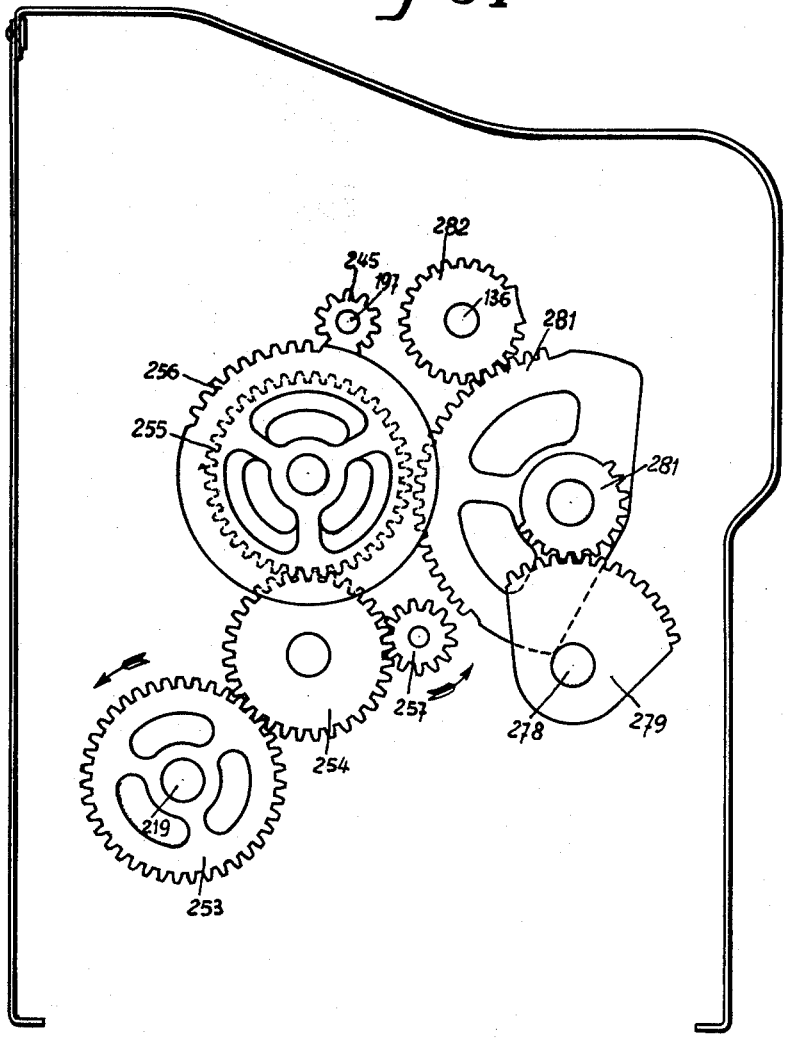
Figure 34 is a section on lines XXXIV—XXXIV of Figures 39 and 42 of the control and ten transfer mechanism for the totalizer and numbering device, of the hand operating mechanism and printing block extracting mechanism.

Figure 34 shows the gears for timely rotating from the main shaft 219 the intermittent toothed wheel 245 keyed on the spindle 197 which also has the totalizer rotatable thereon. The shaft 197 rotates in turn the ten transfer shaft 251 of the totalizer, Figure 39, over the toothed wheel 247, the two intermittent wheels 514 and toothed wheel 248.

The shaft 197 also operates all the serial numbering units, Figure 24.

Movement is performed as follows. The main shaft 219 which, as mentioned above, starts rotating upon actuation of the release push-button 11, carries along the wheel 253, Figure 34, secured thereto, see also Figure 42, which constantly meshes with the toothed wheel 254 meshing in turn with the wheel 255 secured to the wheel 256. The latter timely meshes with the intermittent wheel 245. The wheels 254, 255, 256 are loosely mounted on two shafts secured to the right side wall of the printing mechanism.

Hand operation of the printing slide is effected by means of a crank which is fitted on the shaft of the pinion 257 rotating on a pivot secured to the right side wall of the slide which is in constant mesh with the intermediate wheel 254.

Figure 35:
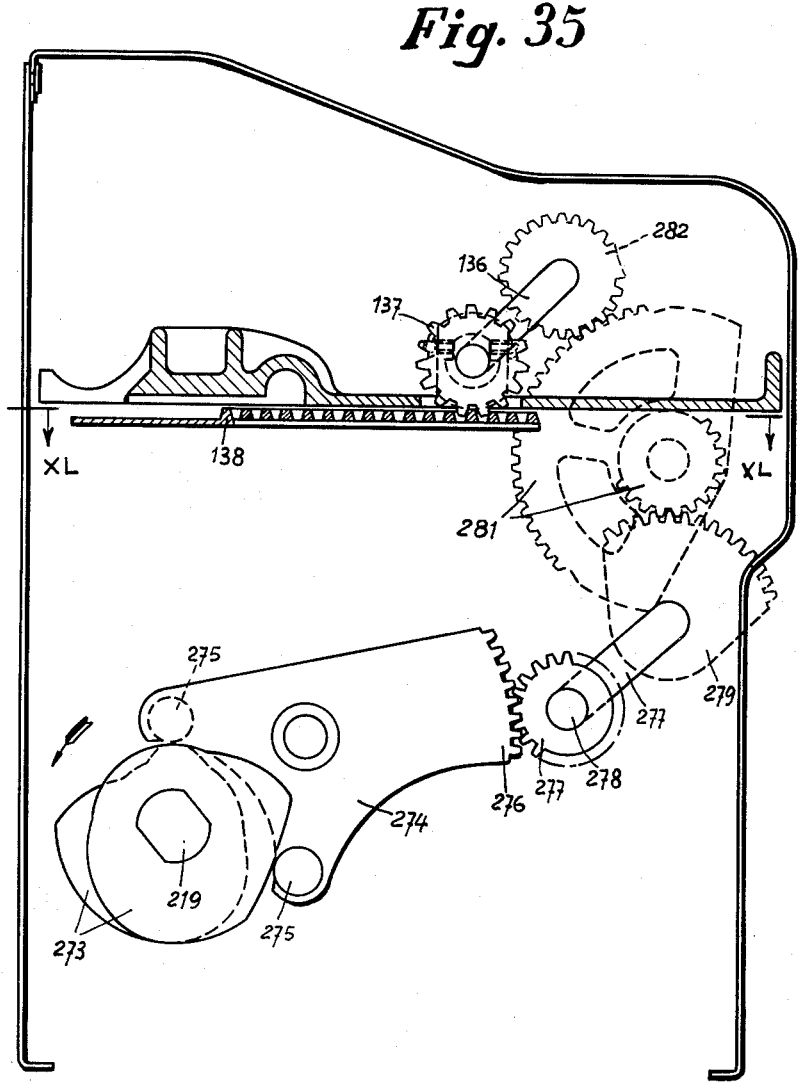
Figure 35 is a section on line XXXV—XXXV of Figure 42 of the printing block extracting mechanism.

In Figure 35 showing the unit for extracting and automatically returning the printing block from and into the magazine, 273 denotes a double cam, secured to the main shaft 219. The cam reciprocates the lever 274 provided with rollers 275 and a toothed segment 276 meshing with a further toothed segment of the lever 277 loosely mounted on the pivot 278 secured to the right side wall of the printing mechanism. A lever 279, Figure 34, secured to the lever 277, also rotates on the pivot 278.

The lever 279 is provided with a toothed segment which is in constant mesh with a double sector 281, Figure 34, meshing with the intermittent toothed wheel 282 keyed to the spindle 136. It has been seen from Figure 29 that the spindle 136 is secured to the toothed wheel 137 meshing with the slide 138 carrying the extracting hook 272, Figure 40, for the printing block. Consequently, the cam 273 timely extracts and withdraws the printing block from and into the magazine.

Figures 36, 37, 38 show the release push-button 11 and the following mechanism connected thereto:

(a) Mechanisms for releasing the slide 1 through pivot 287, slide 286, pivot 212, lever 213 and shaft 150. This movement has been described with reference to Figure 31.

(b) Mechanism for feeling the ticket blank in order to keep the machine from starting when the blank has not been introduced at all, or has not been fully introduced.

Said mechanism operating through pull rod 510 and cooperation of the teeth 511 and 164a, has already been described with reference to Figure 33.

(c) Mechanisms for clearing the outlet opening for the printing block through pull rod 84, pivot 211, toothed segments 85 and shaft 86. Operation of said mechanism has already been described with reference to Figure 24.

(d) Individual release mechanism comprising a cam 263, see also Figure 42, actuated by the main shaft 219 which rotates, soon after release of the machine, the lever 264 rotating on pivot 515 secured to the right side of the printing mechanism. The lever 264 is hinged to a pull rod 516 carrying the pivot 287 acted upon by the rod 11a of the push-button 11. Consequently, upon release the pivot 287 is disengaged from the push-button producing individual release.

The lever 264 ends below by an extension 517 having an incline acting on the roller 518 of the reversing lever 519 for the slide 286.

Figure 39:
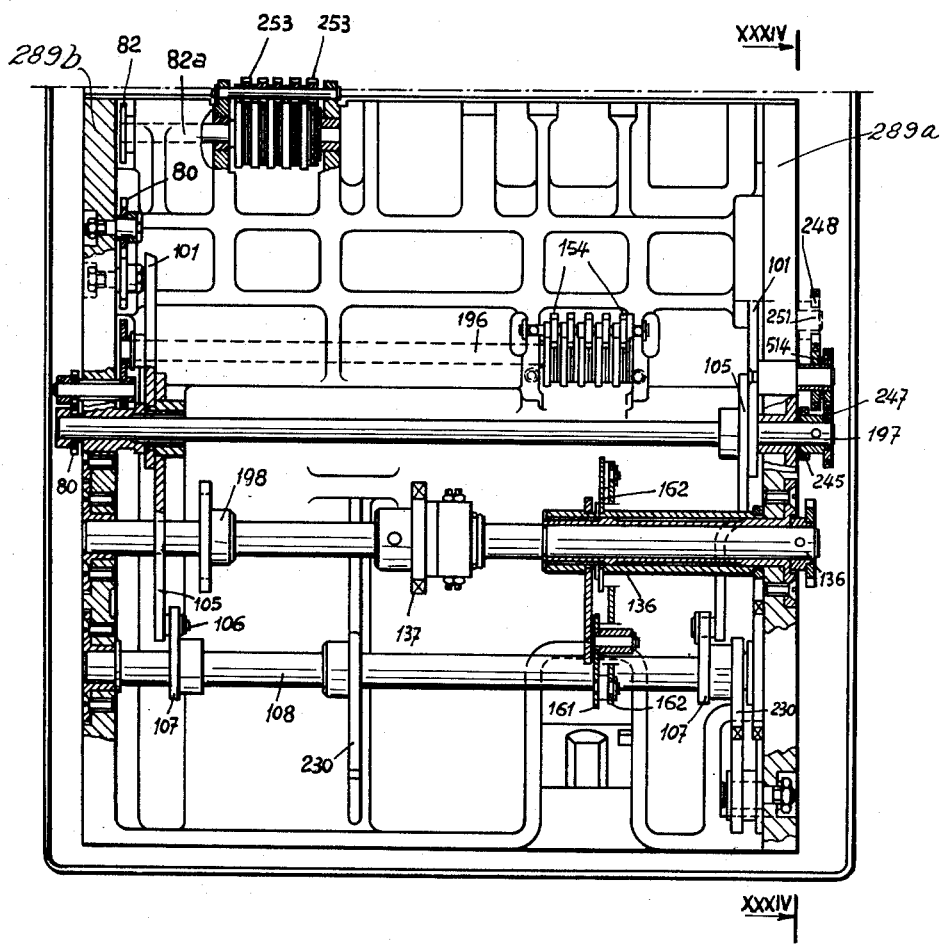
Figure 39 is a section on line XXXIX—XXXIX of Figure 30 of the controls carried by the slide top plate.

Figure 39 shows the shaft 197 for common control of the serial numbering mechanisms 154, 253 and 153 (Figure 43) printing the ticket, check tape and collected amount card, respectively. The first two serial numbering mechanisms receive movement from the common shaft 197 through the set of gears 80 described above with reference to Figure 24 in direct mesh with the shaft 197 and toothed wheel 82.

The third numbering mechanism is operated through a set of gears 514, 248 from the shaft 251 provided with a wheel 520 in mesh with the numbering mechanism 153, Figure 41. The side walls 101 of the totalizer rotate on the shaft 197.

Figure 39 also shows the shaft 136 actuating the adjustable toothed wheel 137 for extracting the printing block, which has been previously described with reference to Figures 29 and 35, the intermittent wheel 198, previously described with reference to Figure 31 and ticket expelling mechanism operating the levers 161, 162 and hollow shaft 163, previously described with reference to Figure 30.

Figure 39 shows the shaft 108 for clutching in the totalizer through levers 107, 105 and rollers 106, described with reference to Figure 26, for operating the double-armed lever 230 coupling the printing block mentioned with reference to Figure 32.

Figure 40 shows in plan view the guides 301 for displacement of the frame 159, Figure 41, supporting the ticket blank carrier 157 and guides 302 for the slide 138 carrying the hook 272 for extracting the printing block and for the slide 233 coupling the printing block.

With reference to Figure 32, it has previously been mentioned that the slide 233 timely moves forward under the action of the camshaft. The displacement causes the tooth 303 on the slide 233 to be engaged by a suitable recess in the intermittent wheel 304 which rotates in turn the hook 272 engaging the printing block under the action of the tooth 305 on the intermittent wheel 304 upon the tooth 306 on the hook 272 which is firmly retained in the engaged position owing to the cooperation of the smooth surfaces on the wheel 304 and hook 272.

The hook 74 on the printing block frame 45, Figure 18, is caught by the hook 272 and the printing block is removed from the magazine. On the return stroke of the slide 233 the reverse movement takes place and the printing block is left in the magazine, this being assisted by the action of the spring 307 which is pivoted and secured to the slide 138 by means of the screw 308.

Figure 40 also shows the guides for the slide 199 which by means of the rack 200 moves laterally the carrier 157, as will be better understood from Figure 41.

Figure 41 shows in full lines the frame 159 comprising the rack 241, two shafts 158 and side wall 309 in the withdrawn position at the beginning of the cycle, the blank carrier 157 being moved fully to the right.

The same figure shows in dash lines the same unit in its forward position on printing of the ticket.

The members operating for moving the carrier 157 have already been in part described with reference to Figure 31. When the carrier 159 is in its forward position shown in dash lines, the carrier being on the right, the rack 200, Fig. 40, comes into action, and, by meshing with the intermittent toothed wheel 310 pivoted to the head 309, moves to the left the carrier 157 by means of the rack 311 carried by the arm 312 secured to the frame 157. The smooth portion 313 of the intermittent wheel 310 holds the carrier 157 in this position. Displacement to the right takes place on a reverse actuation.

Figure 41 shows in front of the frame 159 the set of the three inking rollers 176, for the date stamp, serial numbering of the ticket printing block and numbering of the control tape, seen from the right to the left, rotating on the stem 175 which is secured by means of a resilient pawl 314 to the two resilient levers 174 rotating on the front shaft 158 of the frame 159.

Figure 42 shows the main shaft 219 rotating in bushes on the side walls 289a and 289b of the printing slide. The shaft 219 has secured thereto the cams and the following members:

(a) Double cam 97 actuating the gears which open and close the openings 8 for extraction of the printing blocks, as described with reference to Figure 24;

(b) Toothed wheels 208, 209, worm wheel 135, ratchet wheel 210, pawl 215, pivot 216, disc 217, bush 218 for electric actuation of the slide as described with reference to Figures 26 and 31;

(c) Resilient cam 148 operating the electric motor switch, as described with reference to Figure 29;

(d) Cam 114 for printing and feeding the control tape through roller 115, strut 113, pivot 112 as described with reference to Figure 26;

(e) Cam 141 for printing the ticket by means of the printing block 45 through roller 142, hammer 139 as described with reference to Figure 29;

(f) Cam 185 printing the date and serial number on the ticket through roller 184, pivot 183, side walls 181, spacers 182, hammer 180, as described with reference to Figure 30;

(g) Double cam 221 for coupling and uncoupling the totalizer, as described with reference to Figure 32;

(h) Double cam 273 for extracting and retracting the printing block from and into the magazine as described with reference to Figure 35;

(i) Double cam 234 for feeding and withdrawing the blank carrier frame, as described with reference to Figure 33;

(l) Cam 263 for individual release, as described with reference to Figure 36;

(m) Toothed gear 253 operating the ten transfer shaft on the totalizer and for operation by means of a crank, as described with reference to Figure 34.

The totalizer shown in Figure 43 shall now be described in detail. The totalizer comprises two side walls 101 on which are rotatably mounted:

(a) The shaft 315 on which eight amount pinions 102 and the mechanism 153 for serial numbering of the collected amount card. The first four pinions 102 on the right each consist of a toothed wheel 316, a printing disc 317 and a disc 318 with a projection having an incline for preparing ten transfer, solidly connected together.

The next four pinions 102 distinguish from the former merely in that the disc 318 is in the form of a gear for direct drive for ten transfer:

(b) The shaft 319 on which are idly mounted for rotation five intermediate toothed wheels 103 for connection to the toothed wheels picking up the amount from the racks of the printing block 45;

(c) The shaft 320 on which rotate the five wheels 104 picking up the values of the racks of the printing block.

The wheels are spaced by a pitch equalling the pitch between the five racks 65, Figure 21, on the printing block 45. Said wheels are secured to a set of tubes 321 differing in length, connected in turn by a front bayonet joint to a set of toothed wheels 322 spaced by a pitch equalling the pitch between the intermediate wheels 103 and between the wheels 316 of the pinions 102;

(d) The shaft 251 which carries along by means of a cotter four cams 252 for ten transfer of the first four right-hand pinions 102 and on which loosely rotate three intermittent gears 323 for the ten transfer on the remaining pinions 102.

The cams 252 are secured to a disc 324 provided with a projection 325 having an incline timely cooperating with the incline on the projection on the discs 318 of the first four right-hand pinions.

The ten transfer takes place as follows.

(1) When any of the four right-hand pinions 317 goes over from the nine value to the zero value, it abuts the incline on the projection on the disc 316, the corresponding projection 325 on the disc 324 on the corresponding cam 252 displacing to the left the cam 252 which comes within the range of rotation of the wheel 316 of the pinion 317 directly on the left.

As described with reference to Figure 34, rotation of the shaft 251 secured to the wheel 248 timely stores the tens transmitted to the cams 252 which on completion of the rotation of the shaft 251 resumes its initial position under the action of the inclines on the projection 326 against the rack 327.

(2) When any of the remaining four left-hand pinions 102 goes over from the 9 value to the zero value, this results in prompt release of a tooth of the pinion 102 directly on the left over the corresponding intermittent gear 323.

The date stamp, also shown in Figure 43, comprises, as described with reference to Figure 30, two side walls 188 rotating on the pivot 187 fixed to the side walls 180 of the ticket printing hammer.

Printing discs 177 rotate on the side walls 188 and are connected by means of sets of tubes 328 secured to the corresponding discs 329 projecting from the right side of the covering of the slide 1 and protected by the lid 14 (Figure 1).

The discs 329 are timed with the corresponding printing discs 177 and have engraved therein the arabic figures of the days and years and roman figures for the mouth.

Figures 44 and 45 show the device for printing on the collected amount card the value stored by the pinions 102 of the totaliser and serial numbering mechanism 153, Figure 43, coaxial therewith. The collected amount card is fitted into the case 330 provided with a slidable portion 331 operated from the outside by means of a plate 332 connected thereto by means of two standards 333, to permit printing in two different positions of the values corresponding to the beginning and end of the period of work of the attendant.

298 denotes the hammer provided with rubber press pad 334 for printing on the collected amount card by means of a frame carrying the inked ribbon.

Printing is effected by means of an eccentric 296 acting on the hammer 298 which is provided with an arm 297 engaging underneath the lever 299 when the eccentric 296 is not in its operative position, preventing release of the machine through the pull rod 510 of the feeler.

Figure 46 shows in plan view the bed plate

203 provided with four standards 204 for attachment of the side walls of the printing slide, on which the following members are fixed:

(a) Electric motor 132 provided with a centrifugal governor 195. In front thereof a case 205 has rotatable therein the shaft secured to the two reducing gears 206, 207, previously described with reference to Figure 31;

(b) The shaft 150 provided with a lever 213 and roller 212, secured together, actuating the two struts 149, 214 operating the motor electric contact for the motor and release of the hook 215 (Figure 31);

(c) A lever switch 335 for cutting off from the outside of the slide covering, of the current feed to the motor.

The operating cycle of the machine takes place as follows.

On starting service the operator introduces the control card into the opening 12 and prints by means of a crank fitted into the hole 13a the total previously stored by the machine.

In order to deliver the tickets the operator lowers one of the setting levers to bring the pointer in front of the desired station appearing on the setting row. This movement lights the setting row light, brings the station printing block in front of the outlet opening and prepares operation of the statistical counter for the given station, which records the number of tickets delivered for said station. The operator then displaces by hand the printing slide to bring it in front of the selected row, introduces the blank into the opening 10 and starts the machine by depressing the push-button 11. The printing block outlet opening is cleared, the printing slide and setting lever being blocked in their position. The electric control circuit for the prepared statistical counter is closed or the counter is mechanically operated and the motor driving the main camshaft is started. The card blank carrier is moved forward towards the ticket numbering mechanism and date printing hammer. At the same time, the printing block extractor engages the desired printing block and starts extraction. During extraction the printing block rack actuates the totalizer. At the same time printing is effected by the date hammer and numbering mechanism. As the extractor completes the extracting stroke, the ticket blank carrier is moved transversely to register with the printing block. At the end of the movement a press pad lifts the blank causing the ticket to be printed by the overlying printing block. Upon completion of this operation the ticket carrier resumes its starting position along a diagonal path. The control tape is then printed by means of the printing block by effect of the oscillation of the unit carrying the control tape. The expelling mechanism expels the printed ticket through the inlet opening. The totalizer is released from the printing block racks and transfers any prepared tens. The printing block extractor returns the block into the magazine and is withdrawn into the printing mechanism as it is set free from the printing block. The printing block outlet opening is closed releasing the printing slide and setting lever from their blocked position.

At the end of his service period the operator again introduces the control cord into the opening 12 and prints by means of the crank the final stored total. The difference between both totals is the amount cashed during his service period.

Should the supply of electric current fail, the main camshaft is rotated by hand by means of the crank which is fitted in position by removing the plug 13.

What I claim is:

1. Machine for delivering and recording tickets, more particularly railway tickets, comprising in combination a casing in which a plurality of drum shaped magazines are rotatable about a common axis, said magazines being formed with radial seatings receiving supporting members for frames carrying the ticket printing blocks and totalizer control racks, a set of setting levers equalling in number the magazines carried by said casing and adapted to rotate said magazines in order to cause the seating containing the frame corresponding to the ticket to be issued to come in front of an outlet opening bored in said casing at each magazine, a plurality of vertical arrangements of statistical counters equalling in number the drum shaped magazines, each of said vertical arrangements comprising counters equalling in number the ticket printing frames placed in the associated drum shaped magazine and each counter in each vertical arrangement corresponding to a frame in the associated drum shaped magazine, means driven by the setting levers for rotating the drum shaped magazines, for preselecting the counter corresponding to the particular ticket set upon setting said ticket, a slide mounted for displacement on guides carried by said casing and parallel with the axis of rotation of said magazines, said slide being adapted to be brought in front of each outlet opening, means within the slide for seizing the said preselected frame, introducing it into the slide, printing by means of the printing blocks in said frame the blank introduced into slide and withdrawing said frame into the magazine, a totalizer contained in the slide and adapted to be actuated by the racks carried by the previously mentioned frame by effect of its translational movement during the travel within the slide, means for advancing of one step the preselected statistical counter upon printing the ticket.

2. Machine as claimed in claim 1 in which the statistical counters are electrically actuated.

3. Machine as claimed in claim 1 in which the statistical counters are mechanically operated.

4. Machine for delivering and recording tickets as claimed in claim 1, wherein each rack is formed with a number of teeth equalling the corresponding numerals in the fare of the ticket, the totalizer being provided with driving toothed wheels engaging said racks on introduction of the frame in the printing slide.

5. Machine as claimed in claim 1, in which each frame carrying the ticket printing blocks and totalizer control racks is formed at its inner end with wings abutting the inner edge of a cup secured to the axis of rotation of the magazine at each magazine and having a slot cut therein in front of the outlet opening associated with each magazine.

6. Machine as claimed in claim 1, in which the casing is provided with shutters cooperating with the outlet openings for the frame carrying the printing ticket blocks and totalizer control racks in order to keep said openings normally closed, driving means carried by the printing slide causing said opening to open and close at the beginning and end of each cycle, respectively.

7. Machine for delivering and recording tickets, more particularly railway tickets, comprising in combination a casing in which a plurality of drum shaped magazines are rotatable about a common axis, said magazines being formed with radial seatings receiving supporting members for frames carrying the ticket printing blocks and totalizer control racks, each of said frames having fixed thereto on one face ticket printing blocks and on the opposite face a plate formed with longitudinal slots serving as seats for the racks controlling the totalizer, a set of setting levers equalling in number the magazines carried by said casing and adapted to rotate said magazines in order to cause the seating containing the frame corresponding to the ticket to be issued to come in front of an outlet opening bored in said casing at each magazine, a plurality of vertical arrangements of statistical counters equalling in number the drum shaped magazines, each of said vertical arrangements comprising counters equalling in number the ticket printing frames placed in the associated drum shaped magazine and each counter in each vertical arrangement corresponding to a frame in the associated drum shaped magazine, means driven by the setting levers for rotating the drum shaped magazines, for preselecting the counter corresponding to the particular ticket set upon setting said ticket, a slide mounted for displacement on guides carried by said casing and parallel with the axis of rotation of said magazine, said slide being adapted to be brought in front of each outlet opening, means within the slide for seizing the said preselected frame, introducing it into the slide, printing by means of the printing blocks in said frame the blank introduced into the slide and withdrawing said frame into the magazine, a totalizer contained in the slide and adapted to be actuated by the racks carried by the previously mentioned frame by effect of its translational movement during the travel within the slide, means for advancing of one step the preselected statistical counter upon printing the ticket.

8. Machine for delivering and recording tickets as claimed in claim 7, wherein the plate formed with longitudinal slots is detachably secured to the frame carrying the ticket printing block by means of hooks and a resilient washer.

9. Machine for delivering and recording tickets as claimed in claim 7, wherein the ticket printing block is formed with slots serving as seatings for further printing blocks for the fare of the ticket.

10. Machine for delivering and recording tickets, more particularly railway tickets, comprising in combination a casing in which a plurality of drum shaped magazines are rotatable about a common axis, said magazines being formed with radial seatings receiving supporting members for frames carrying the ticket printing blocks and totalizer control racks, a set of setting levers equalling in number the magazines carried by said casing and adapted to rotate said magazines in order to cause the seating containing the frame corresponding to the ticket to be issued to come in front of an outlet opening bored in said casing at each magazine, a plurality of vertical arrangements of statistical counters equalling in number the drum shaped magazines, each of said vertical arrangements comprising counters equalling in number the ticket printing frames placed in the associated drum shaped magazine and each counter in each vertical arrangement corresponding to a frame in the associated drum shaped magazine, means driven by the setting levers for rotating the drum shaped magazines, for preselecting the counter corresponding to the particular ticket set upon setting said ticket, a slide mounted for displacement on guides carried by said casing and parallel with the axis of rotation of said magazine, said slide being adapted to be brought in front of each outlet opening, means within the slide for seizing the said preselected frame, introducing it into the slide, printing by means of the printing blocks in said frame the blank introduced into the slide and withdrawing said frame into the magazine, a counter within said slide, means for printing on the ticket the serial number carried by said counter, means for advancing said counter of one step at each ticket issued, a totalizer contained in the slide and adapted to be actuated by the racks carried by the previously mentioned frame by effect of its translational movement during the travel within the slide, means for advancing of one step the preselected statistical counter upon printing the ticket.

11. Machine for delivering and recording tickets, more particularly railway tickets, comprising in combination a casing in which a plurality of drum shaped magazines are rotatable about a common axis, said magazines being formed with radial seatings receiving supporting members for frames carrying the ticket printing blocks and totalizer control racks, a set of setting levers equalling in number the magazines carried by said casing and adapted to rotate said magazines in order to cause the seating containing the frame corresponding to the ticket to be issued to come in front of an outlet opening bored in said casing at each magazine, a plurality of vertical arrangements of statistical counters equalling in number the drum shaped magazines, each of said vertical arrangements comprising counters equalling in number the ticket printing frames placed in the associated drum shaped magazine and each counter in each vertical arrangement corresponding to a frame in the associated drum shaped magazine, means driven by the setting levers for rotating the drum shaped magazines, for preselecting the counter corresponding to the particular ticket set upon setting said ticket, a slide mounted for displacement on guides carried by said casing and parallel with the axis of rotation of said magazine, said slide being adapted to be brought in front of each outlet opening, means within the slide for seizing the said preselected frame, introducing it into the slide, printing by means of the printing blocks in said frame the blank introduced into the slide and withdrawing said frame into the magazine, a first counter within said slide, means for printing on the ticket the serial number carried by said counter, means for advancing the said counter by one step at each ticket issued, a control tape within said slide, means for advancing said control tape, means for printing on said control tape the data recorded by the printing blocks for the ticket, a second counter, means for advancing said second counter by one step at each ticket issued, said means being connected to the means for advancing the first counter, means for printing on said record tape the number carried by said second counter, a totalizer contained in the slide and adapted to be actuated by the racks carried by the previously mentioned frame by effect of its translational movement during the travel within the slide, means for advancing of one step the preselected statistical counter upon printing the ticket.

12. Machine for delivering and recording tickets, more particularly railway tickets, comprising in combination a casing in which a plurality of drum shaped magazines are rotatable about a common axis, said magazines being formed with radial seatings receiving supporting members for frames carrying the ticket printing blocks and totalizer control racks, a set of setting levers equalling in number the magazines carried by said casing and adapted to rotate said magazines in order to cause the seating containing the frame corresponding to the ticket to be issued to come in front of an outlet opening bored in said casing at each magazine, a plurality of vertical arrangements of statistical counters equalling in number the drum shaped magazines, each of said vertical arrangements comprising counters equalling in number the ticket printing frames placed in the associated drum shaped magazine and each counter in each vertical arrangement corresponding to a frame in the associated drum shaped magazine, means driven by the setting levers for rotating the drum shaped magazines, for preselecting the counter corresponding to the particular ticket set upon setting said ticket, a slide mounted for displacement on guides carried by said casing and parallel with the axis of rotation of said magazine, said slide being adapted to be brought in front of each outlet opening, means within the slide for seizing the said preselected frame, introducing it into the slide, printing by means of the printing blocks in said frame the blank introduced into the slide and withdrawing said frame into the magazine, a first counter within said slide, means for printing on the ticket the serial number carried by said counter, means for advancing said counter of one step at each ticket issued, a control tape within said slide, means for advancing said control tape, means for printing on said control tape the data recorded by the printing block for the ticket, a second counter, means for advancing said second counter of one step at each ticket issued, a third counter in the slide visible through an opening in the casing for the slide, means connected to the means for actuating the first and second counter for advancing said third counter by one step at each ticket issued, means for printing on said record tape the number carried by said second counter, a totalizer contained in the slide and adapted to be actuated by the racks carried by the previously mentioned frame by effect of its translational movement during the travel within the slide, means for advancing of one step the preselected statistical counter upon printing the ticket.

13. Machine for delivering and recording tickets, more particularly railway tickets, comprising in combination a casing in which a plurality of drum shaped magazines are rotatable about a common axis, said magazines being formed with radial seatings receiving supporting members for frames carrying the ticket printing blocks and totalizer control racks, a set of setting levers equalling in number the magazines carried by said casing and adapted to rotate said magazines in order to cause the seating containing the frame corresponding to the ticket to be issued to come in front of an outlet opening bored in said casing at each magazine, a plurality of vertical arrangements of statistical counters equalling in number the drum shaped magazines, each of said vertical arrangements comprising counters equalling in number the ticket printing frames placed in the associated drum shaped magazine and each counter in each vertical arrangement corresponding to a frame in the associated drum shaped magazine, means driven by the setting levers for rotating the drum shaped magazines, for preselecting the counter corresponding to the particular ticket set upon setting said ticket, a slide mounted for displacement on guides carried by said casing and parallel with the axis of rotation of said magazine, said slide being adapted to be brought in front of each outlet opening, means within the slide for seizing the said preselected frame, introducing it into the slide, printing by means of the printing blocks in said frame the blank introduced into slide and withdrawing said frame into the magazine, a first counter within said slide, means for printing on the ticket the serial number carried by said counter, means for advancing said counter of one step at each ticket issued, a control tape within said slide, means for advancing said control tape, means for printing on said control tape the data recorded by the printing block for the ticket, a second counter, means for advancing said second counter of one step at each ticket issued, a third counter in the slide visible through an opening in the casing for the slide, a fourth counter in said slide, means connected to the means for actuating the first, second and third counter for advancing said fourth counter by one step at each ticket issued, a totalizer contained in the slide and adapted to be actuated by the racks carried by the previously mentioned frame by effect of its translational movement during the travel within the slide, means for advancing of one step the preselected statistical counter upon printing the ticket.

14. Machine for delivering and recording tickets, more particularly railway tickets, comprising in combination a casing in which a plurality of drum shaped magazines are rotatable about a common axis, said magazines being formed with radial seatings receiving supporting members for frames carrying the ticket printing blocks and totalizer control racks, a set of setting levers equalling in number the magazines carried by said casing and adapted to rotate said magazines in order to cause the seating containing the frame corresponding to the ticket to be issued to come in front of an outlet opening bored in said casing at each magazine, a plurality of vertical arrangements of statistical counters equalling in number the drum shaped magazines, each of said vertical arrangements comprising counters equalling in number the ticket printing frames placed in the associated drum shaped magazine and each counter in each vertical arrangement corresponding to a frame in the associated drum shaped magazine, means driven by the setting levers for rotating the drum shaped magazines, for preselecting the counter corresponding to the particular ticket set upon setting said ticket, a slide mounted for displacement on guides carried by said casing and parallel with the axis of rotation of said magazine, said slide being adapted to be brought in front of each outlet opening, means within the slide for seizing the said preselected frame, introducing it into the slide, printing by means of the printing blocks in said frame the blank introduced into the slide and withdrawing said frame into the magazine, a first counter within said slide, date wheels mounted on a common shaft, means for controlling said date wheels from the outside of the slide, means for printing on the ticket the data recorded on the first counter and date wheels, means for advancing said counter of one step at each ticket issued, a control tape within said slide, means for advancing said control tape, means for printing on said control tape the data recorded by the printing block for the ticket, a second counter, means for advancing said second counter of one step at each ticket issued, a third counter in the slide visible through an opening in the casing for the slide, a fourth counter in said slide, means connected to the means for actuating the first, second and third counter for advancing said fourth counter by one step at each ticket issued, a totalizer within the slide to be actuated by the racks carried by the previously mentioned frame by effect of its translational movement during the travel within the slide, means for printing the data recorded on the totalizer and fourth counter, means for advancing by one step the preselected statistical counter upon printing the ticket.

References Cited in the file of this patent

UNITED STATES PATENTS

| Number | Name | Date |
|---|---|---|
| 857,497 | Taylor | June 18, 1907 |
| 899,671 | Lebeis | Sept. 29, 1908 |
| 1,077,194 | Eller | Oct. 28, 1913 |
| 1,091,498 | Friedlein | Mar. 31, 1914 |
| 1,607,435 | Carroll | Nov. 16, 1926 |
| 1,908,944 | Baber, Jr. | May 16, 1933 |
| 1,925,735 | Sundstrand | Sept. 5, 1933 |
| 2,090,612 | Marquart | Aug. 17, 1937 |
| 2,335,122 | Julius et al. | Nov. 23, 1943 |

FOREIGN PATENTS

| Number | Country | Date |
|---|---|---|
| 37,982 | Norway | Oct. 1, 1923 |